(12) United States Patent
Färber et al.

(10) Patent No.: US 7,946,648 B2
(45) Date of Patent: May 24, 2011

(54) PANEL DEVICE FOR A SLIDING ROOF ARRANGEMENT OF A VEHICLE

(75) Inventors: Manfred Färber, Wielenbach (DE); Alexander Bergmiller, Koenigsbrunn (DE)

(73) Assignee: Webasto AG, Stockdorf (DE)

( * ) Notice: Subject to any disclaimer, the term of this patent is extended or adjusted under 35 U.S.C. 154(b) by 164 days.

(21) Appl. No.: 12/293,707

(22) PCT Filed: Mar. 1, 2007

(86) PCT No.: PCT/DE2007/000376
§ 371 (c)(1),
(2), (4) Date: Sep. 19, 2008

(87) PCT Pub. No.: WO2007/110022
PCT Pub. Date: Oct. 4, 2007

(65) Prior Publication Data
US 2010/0164252 A1 Jul. 1, 2010

(30) Foreign Application Priority Data
Mar. 29, 2006 (DE) .......................... 10 2006 014 642

(51) Int. Cl.
*B60J 7/22* (2006.01)
(52) U.S. Cl. .................................................. 296/217
(58) Field of Classification Search ................ 296/217
See application file for complete search history.

(56) References Cited

U.S. PATENT DOCUMENTS

| 4,089,557 | A | * | 5/1978 | Leiter | 296/221 |
| 4,966,409 | A | * | 10/1990 | Schmidhuber et al. | 296/213 |
| 5,484,184 | A | * | 1/1996 | Kohlpaintner et al. | 296/217 |
| 6,457,769 | B2 | * | 10/2002 | Hertel et al. | 296/217 |
| 7,121,618 | B2 | * | 10/2006 | Uehara et al. | 296/217 |
| 7,234,767 | B2 | * | 6/2007 | Boss et al. | 296/217 |

FOREIGN PATENT DOCUMENTS

| DE | 3419900 | * | 11/1985 | 296/217 |
| DE | 3426998 | * | 1/1986 | |
| DE | 19520348 | * | 8/1996 | |
| EP | 1632376 | | 3/2006 | |
| JP | 2001180285 | | 7/2001 | |
| JP | 2006315615 | | 11/2006 | |

OTHER PUBLICATIONS

International Search Report dated Jun. 22, 2007.

* cited by examiner

*Primary Examiner* — Dennis H Pedder
(74) *Attorney, Agent, or Firm* — Fitch, Even, Tabin & Flannery; John Naber

(57) ABSTRACT

The invention relates to a panel device for a sliding roof arrangement of a vehicle, having a panel element for closing a gap between a frame of the sliding roof arrangement and an externally-guided sliding cover when the latter is situated in a ventilator position, having a holding element in which the panel element can be at least partially held, having an actuating element which deploys the panel element relative to the holding element in a first direction, and having force absorbing means, by means of which a force which acts in a second direction perpendicularly on a side of the panel element and perpendicularly to the first direction can be absorbed.

23 Claims, 22 Drawing Sheets

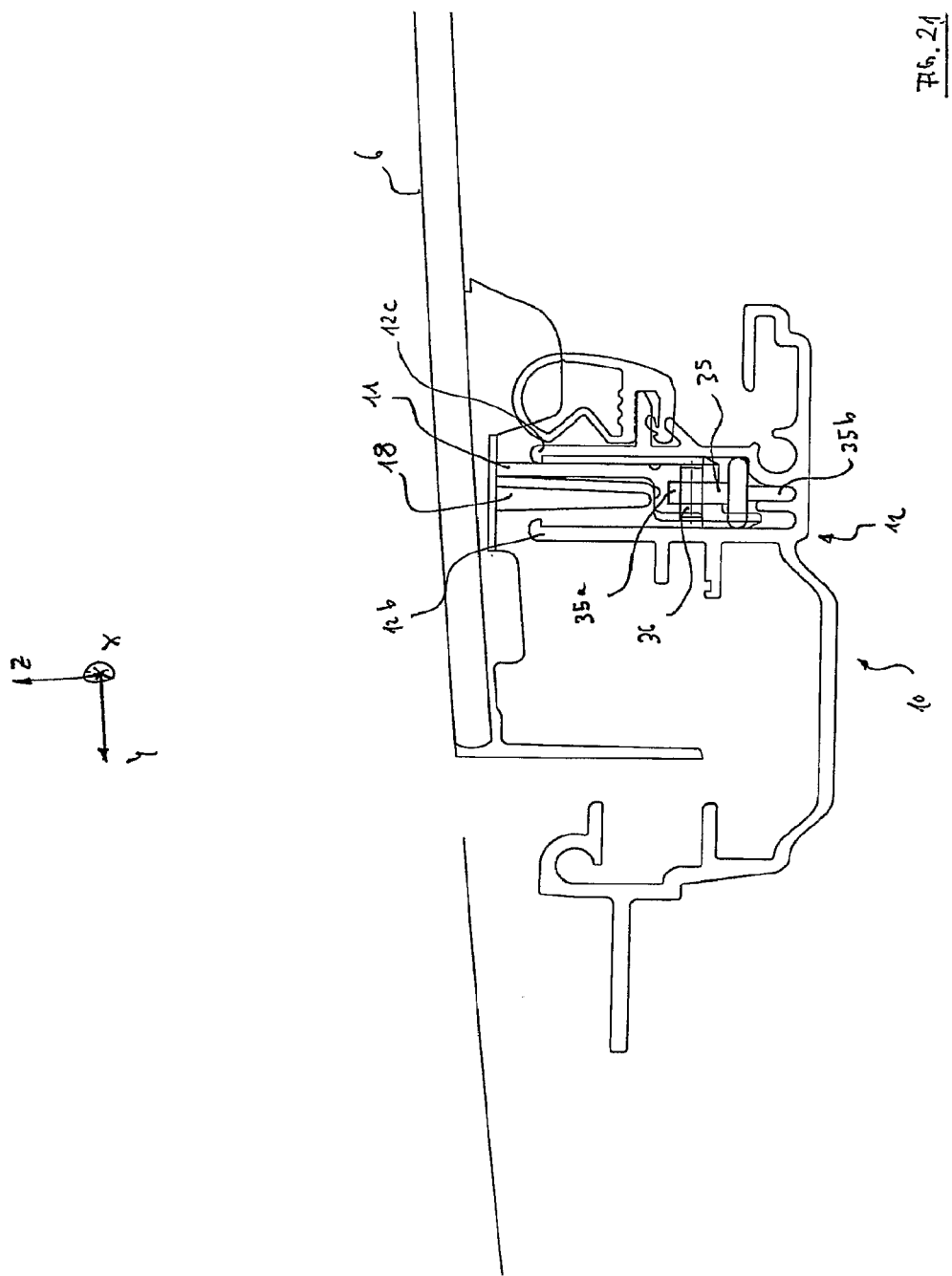

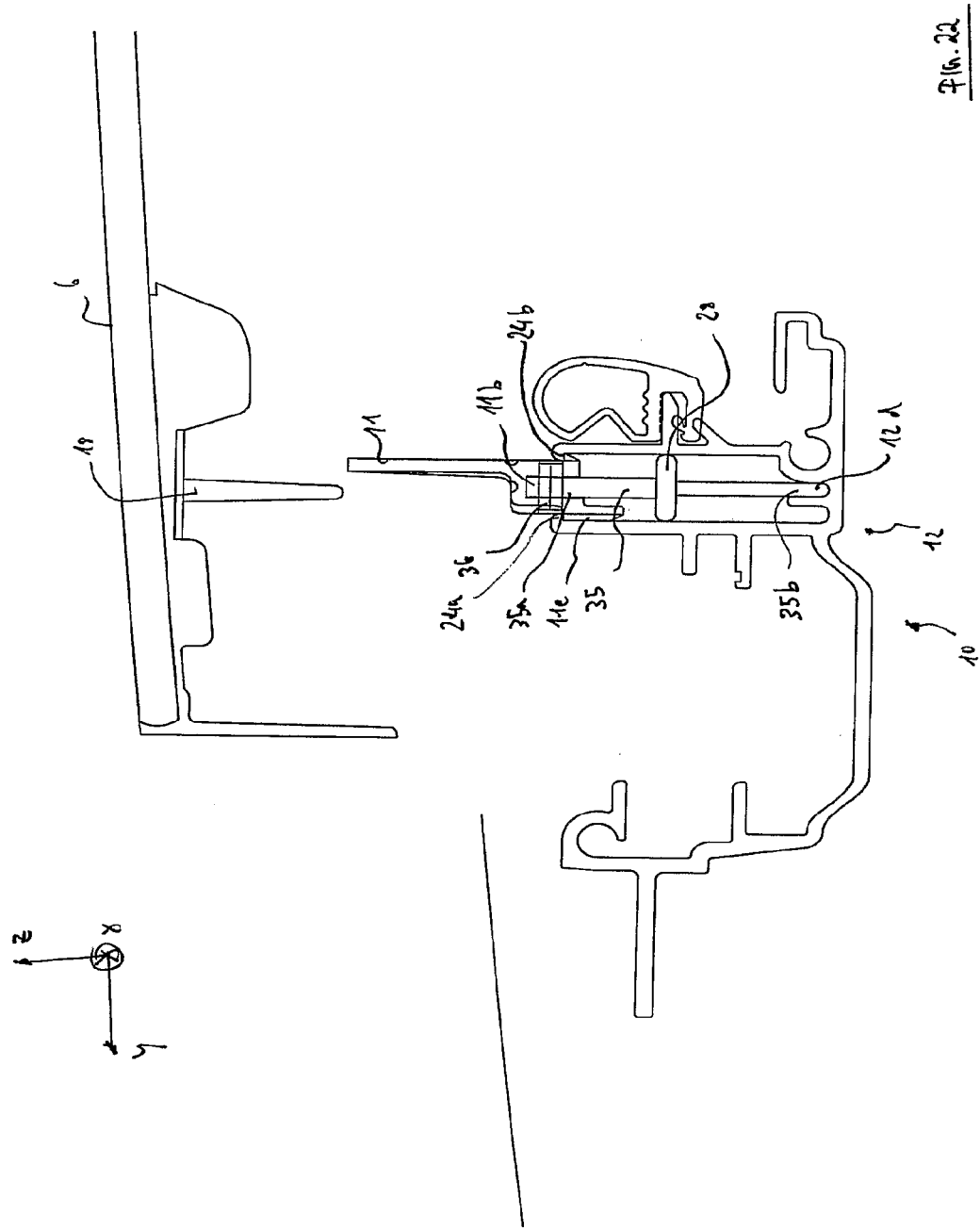

PANEL DEVICE FOR A SLIDING ROOF ARRANGEMENT OF A VEHICLE

This application is a 35 U.S.C. §371 National Stage entry of PCT/DE2007/000376, filed Mar. 1, 2007, which claims priority from German Patent Application No.: 10 2006 014 642.5, filed Mar. 29, 2006, the contents of which are herein incorporated by reference.

The present invention relates to a panel device for a sliding roof arrangement of a vehicle, and to a sliding roof arrangement and a vehicle.

Although able to be used in any panel devices and associated sliding roof arrangements and vehicles, the present invention as well as the problem underlying the invention are explained in more detail hereinafter with reference to a panel device for a sliding roof arrangement, which has an externally guided sliding cover, of a passenger motor vehicle.

Conventional sliding roof arrangements with externally guided sliding covers have, amongst others, a ventilation position. In this ventilation position, the sliding cover is located in a position which is open obliquely to the motor vehicle roof. A gap is opened between a frame of the sliding roof module, against which the sliding cover sealingly bears in a closed position, and the sliding cover. The gap serves for ventilating the interior.

There is the risk that people are injured when they inadvertently put their fingers in the gap whilst the sliding cover moves from the ventilation position into the closed position, in which it bears sealingly against the frame. The forces which occur are sufficiently great that it may result in serious injury.

Moreover, a mechanism arranged in the sliding roof arrangement is visible to passengers when the sliding cover is located in the ventilation position. This a drawback for aesthetic reasons.

In order to be able to prevent this, scissor-action panels and bellows are used, for example.

Scissor-action panels, however, have the drawback that they do not completely close the gap between the roof frame and the sliding cover in the ventilation position. Thus there is still the possibility of trapping.

Bellows have the drawback that they require a large amount of space in the transverse direction of the vehicle for the installation thereof. This requires, however, that the opening which may be opened by means of the sliding cover has to be configured smaller in the transverse direction of the vehicle, in order to allow an installation of the bellows. Such a reduced opening, however, is detrimental to the feeling of space, as for example less sunlight is able to penetrate into the vehicle.

In view of this background, the object of the present invention is to provide an improved panel device. A further object is to provide a panel device which is as space-saving as possible in the transverse direction of the vehicle and/or a panel device with reliable protection against trapping.

According to the invention, at least one of these objects is achieved by a panel device having the features of claim 1 and/or of claim 2 and/or by a sliding roof arrangement having the features of claim 26 and/or by a vehicle having the features of claim 33.

Accordingly, a panel device for a sliding roof arrangement of a vehicle is provided with a panel element for closing a gap between a frame of the sliding roof arrangement and an externally guided sliding cover, when said sliding cover is in a ventilation position, with a receiver element, in which the panel element may be at least partially received, and with an actuating element which deploys the panel element relative to the receiver element in a first direction.

Moreover, a panel device for a sliding roof arrangement of a vehicle is provided with a panel element for closing a gap between a frame of the sliding roof arrangement and an externally guided sliding cover, when said sliding cover is in a ventilation position, with a receiver element in which the panel element may be at least partially received, with an actuating element which deploys the panel element relative to the receiver element in a first direction, and with force absorbing means, by which a force acting in a second direction perpendicular to one side of the panel element and perpendicular to the first direction may be absorbed.

Moreover, a sliding roof arrangement for a vehicle is provided with a frame which may be attached in a roof opening of the motor vehicle, with an externally guided sliding cover, which has a ventilation position in which at least one gap is formed between the frame and the sliding cover, and with at least one panel device according to the invention, by means of which in the ventilation position the at least one gap may be closed.

Moreover, a vehicle is provided with a roof opening in a roof of the vehicle, at least one sliding roof arrangement according to the invention being attached in the roof opening.

Thus the present invention has an advantage relative to the known approaches, in that the gap between the frame of the sliding roof module and the sliding cover may be reliably covered in the ventilation position. As a result, a mechanism arranged in the sliding roof arrangement viewed from the vehicle interior and arranged behind the gap is also concealed. This is therefore not visible for the vehicle occupants, when the sliding cover is in the ventilation position. Thus, firstly, protection against trapping may be achieved and, secondly, the aesthetics may be improved.

A further advantage is the smaller space requirement, which the panel device according to the invention has in the transverse direction of the vehicle. As a result, the roof opening which may be opened by the sliding cover may be designed to be enlarged and therefore this leads to an improved feeling of space for the passengers.

Advantageous embodiments, developments and improvements of the invention are provided in the sub-claims as well as in the description when viewed together with the drawings.

According to a preferred development of the invention, the panel element may be deployed from a first position into a second position in which at least one portion of the panel element is spaced apart further from the receiver element than in the first position. A deployment of the panel element in two defined positions may be easily achieved in terms of design.

In a preferred embodiment, the panel element is configured as an integral and/or elongate and/or substantially rectangular and/or substantially triangular plate. Thus the gap may be easily and completely covered.

In a further preferred embodiment of the invention, the panel element has a substantially L-shaped cross section, the cross section having a long limb and a short limb. This is advantageous as the long limb may be used to cover the gap and the short limb may serve to attach the actuating element.

Preferably, the panel element is configured as a part containing plastics and/or glass fiber-reinforced plastics. Such materials have a relatively high degree of strength with low weight and are able to be easily produced. As a result, fluttering of the panel element may be prevented in driving wind.

In a further preferred embodiment, the actuating element is configured as a spring and/or a lever arm. Thus the panel element may be very easily controlled in terms of design.

It is preferred that a bending moment, which results from a force which acts transversely to the panel element, may be absorbed by the spring, without it resulting in noticeable distortion and/or displacement of the panel element.

According to a further preferred embodiment of the invention the spring is configured as a bow spring and/or spiral spring and/or bent spring and/or torsion spring. Such springs are very space-saving and thus allow an enlarged roof opening in the transverse direction of the vehicle.

It is further preferred that the spring is partially injection-molded into the panel element. Such a connection between the spring and panel element may be achieved very easily and in a time-saving manner in terms of manufacturing, the spring being fixedly connected to the panel element.

In a preferred embodiment of the invention, the receiver element is configured as a profile part. Profile parts have a uniform cross section and are therefore suitable for receiving the panel element.

According to a preferred development, the receiver element has a substantially U-shaped cross section, the cross section having two limbs and a base arranged between the limbs, the panel element in the first position being at least partially arranged between the limbs of the receiver element. In the entire patent application, the term "U-shaped" is understood to mean that two limbs are formed on one base, but not that these are necessarily the same length. In contrast, the limbs may be advantageously designed to be variable in length. The U-shaped cross section has the advantage that it is possible to support the panel element on both limbs. Moreover, it is possible to accommodate the panel element between the limbs in a shielded manner.

It is further preferred that the sides of the panel element are arranged substantially parallel to the internal sides of the limbs. By "substantially parallel" is understood in the entire application to mean a deviation of at most a few degrees, preferably 0 to 20°.

It is further preferred that the panel element is guided between the limbs. As a result, a force which acts at right angles on one side of the panel element, may be absorbed by the limbs. This may be very easily achieved in terms of design.

In a preferred embodiment, the force absorbing means guide the actuating element and/or the panel element along the first axis. The absorption of a force in a transverse direction to the panel element, i.e. in the second direction, may therefore be easily achieved. In particular when the panel element is not guided between the limbs, it is preferred that the spring is provided with means for absorbing a force in the transverse direction to the panel element, in order to prevent a distortion and/or displacement of the panel element in a transverse direction on one side of the panel element.

It is further preferred that the force absorbing means have at least one spacer which is displaceably arranged, bearing against opposing limbs of the receiver element in the first direction. By means of such spacers, the absorption of a force which acts in the transverse direction to the panel element, may be easily achieved in terms of design.

In a preferred embodiment of the invention, the force absorbing means are formed by the opposing sides of the short and long limbs of the panel element, said force absorbing means being displaceably arranged on the limbs of the receiver element at least partially in the first direction. The long limb has in this connection a dual function, namely firstly to cover the gap and secondly to guide the panel element between the limbs of the receiver element.

It is further preferred that limiting means are provided which limit a movement of the panel element in the first direction. As a result, it is prevented that the panel elements when the roof opening is fully open, i.e. the sliding cover is completely moved back out of the roof opening and over the vehicle roof, disadvantageously project beyond the roof and unfavorable wind noise possibly occurs.

It is further preferred that the limiting means are configured as a stop at the end of the limbs, which comes into engagement with corresponding surfaces of the panel element and/or the force absorbing means in the second position. Such a limitation of the movement of the panel element in the first direction may be achieved very easily in terms of design. Corresponding contact surfaces of the panel element are, for example, configured by a shoulder formed on the panel element.

Force absorbing means, which are for example attached to the spring, may be brought into engagement with the stop, in order to limit a movement of the panel element in the first direction.

According to a preferred development, the limiting means comprise an element which may be tensioned, in particular a flexible strip or a flexible wire, which at its one end is connected to the panel element and at its other end is connected to the receiver element, and limits a movement of the panel element toward the receiver element. Such an element which may be tensioned provides a further very simple possibility for limiting a movement of the panel element in the first direction.

Preferably, the actuating element is arranged at least partially between the limbs. This feature facilitates a simple connection of the actuating element to the panel element and further provides the advantage of a compact construction of the panel device.

According to a preferred embodiment, the actuating element is attached at its one end to the panel element and at its other end to the receiver element. Such a connection prevents an inadvertent release of the panel element from the actuating element and/or of the actuating element from the receiver element. The actuating element is preferably attached at its one end to the short limb of the panel element and at its other end to the base of the receiver element. A simple design of the panel device results, therefore.

It is further preferred that the actuating element engages in grooves in the panel element and/or the receiver element. Such an interaction between the actuating element and the panel element and/or the receiver element may be implemented simply and in a space-saving manner in terms of design.

According to a preferred embodiment, the force absorbing means and/or the limiting means are attached to the actuating element. Such a functional integration, the actuating element serving for deploying the panel element but also as a support for the force absorbing means and the limiting means, may lead to a simplified construction of the panel device. In particular the spacers may be fastened to the actuating element. Said spacers then serve for the lateral support on the limbs and may absorb a force which acts at right angles to a surface of the panel element. Moreover, the surfaces of the spacers may be brought into engagement with the limiting means, in particular the stops in order to limit a movement of the panel element in the first direction.

In a further preferred embodiment, the panel element has a snap hook which, by elastic deformation to the limiting means, may be arranged to hook behind and which is displaceable between the limbs in the first direction. Such an embodiment of the invention simplifies the assembly. Snap hooks are made from an elastic material, in particular a plastics material, and have projections for hooking behind. This makes it possible that during assembly they may be rapidly and easily braced in a resilient manner in corresponding recesses. In the invention, these receivers are preferably formed by the stops. If the snap hooks are braced in a resilient manner, a movement thereof in the first direction is limited by the stops, which come into engagement with its projections which are hooked behind. A movement of the snap hook is, however, permitted counter to the first direction. Preferably, the short limb of the L-shaped panel element is configured as a snap hook.

It is further preferred that the panel element has a recess, the actuating element and/or the force absorbing means being arranged in the recess at least in the first position of the panel element. Thus a very compact construction, in particular in a transverse direction to the panel element, of the panel device may be achieved.

It is further preferred that the sliding roof arrangement is designed as a module. A modular construction may, during assembly, result in savings in terms of time and cost.

Preferably, the panel device is provided between an internal edge of the frame and a device arranged in the frame, by means of which the sliding cover is movable. Thus a view of the device is prevented for occupants, which improves the appearance of the sliding roof arrangement.

It is further preferred that the receiver element is itself formed by a part of the frame. Such a functional integration, the frame serving both as a support and as a receiver element, may lead to a simplification of the sliding roof arrangement in terms of manufacture.

In a preferred embodiment of the invention, the sliding cover has an injection-molded or removable further panel element, the further panel element being arranged closer to the panel element at a geometric center of the sliding cover and/or adjacent to the roof opening spanned by the frame. This permits a further improvement to the appearance, as by the further panel element the visibility of the sliding roof arrangement for vehicle occupants may be still further reduced. Moreover, the panel device may be configured even more compactly when the further panel element is not arranged inside the receiver element but outside.

In a preferred embodiment of the invention, the further panel element engages, at least when the sliding cover is closed, in the receiver element and/or is arranged to rest against and/or overlap the panel element. In this embodiment, the panel element and the further panel element may be brought sealingly into abutment, whereby wind noise may be further reduced in the vehicle interior.

Preferably, the sliding roof arrangement has a wind deflector. Combining the wind deflector with the panel devices according to the invention leads to a sliding roof arrangement which as a whole is acoustically and visually improved.

In a further preferred embodiment of the vehicle, one respective panel device is attached to a frame side in the sliding roof arrangement facing in the longitudinal direction of the vehicle. A sliding roof arrangement in which the sliding cover is in the ventilation position, has three gaps, namely two at the side and one to the rear (rear side of the vehicle) relative to the sliding cover. The two side gaps may advantageously be closed by means of the panel devices and have, as a result, protection against trapping and an improved appearance.

In a further preferred embodiment of the invention, the panel device may be attached to a frame portion of the sliding roof arrangement which is arranged transversely to the vehicle and on the front side of the vehicle. The panel device is thus attached between the wind deflector and the roof opening. As a result, advantageously the vehicle occupants are prevented from having a view of the wind deflector, which achieves a further improved appearance.

In the entire application, the "panel element" is understood to be an at least partially flat element which has two sides and a plurality of edges. The sides are provided for covering the gap. Onto the side, a force perpendicular thereto (in this application also denoted as transverse force, which acts in the second direction), may act toward the panel element, for example resulting from a side wind or the hand of a person. A deformation and/or a pivoting and/or displacement of the panel element has to be prevented, therefore, in order to ensure protection against trapping and/or the improved appearance.

In the entire application, "deployment" is understood to be a pivoting and/or a displacement of the panel element relative to the receiver element.

The invention is described in more detail hereinafter with reference to the embodiments shown in the schematic figures of the drawings, in which:

FIGS. 21-22 show sectional views of FIGS. 19 and/or 20.

In all figures of the drawings, elements which are the same and/or functionally the same—insofar as nothing else is disclosed—have been respectively provided with the same reference numerals.

For the entire application the following coordinate system may be used: x in the vehicle longitudinal direction in the direction of the rear of the vehicle, y in the vehicle transverse direction from left to right in a vehicle viewed from the rear side and z perpendicular to the vehicle upwards. x, y, z also denote a longitudinal direction of the panel device, a transverse direction of the panel device and/or a vertical direction of the panel device.

Figure 1:
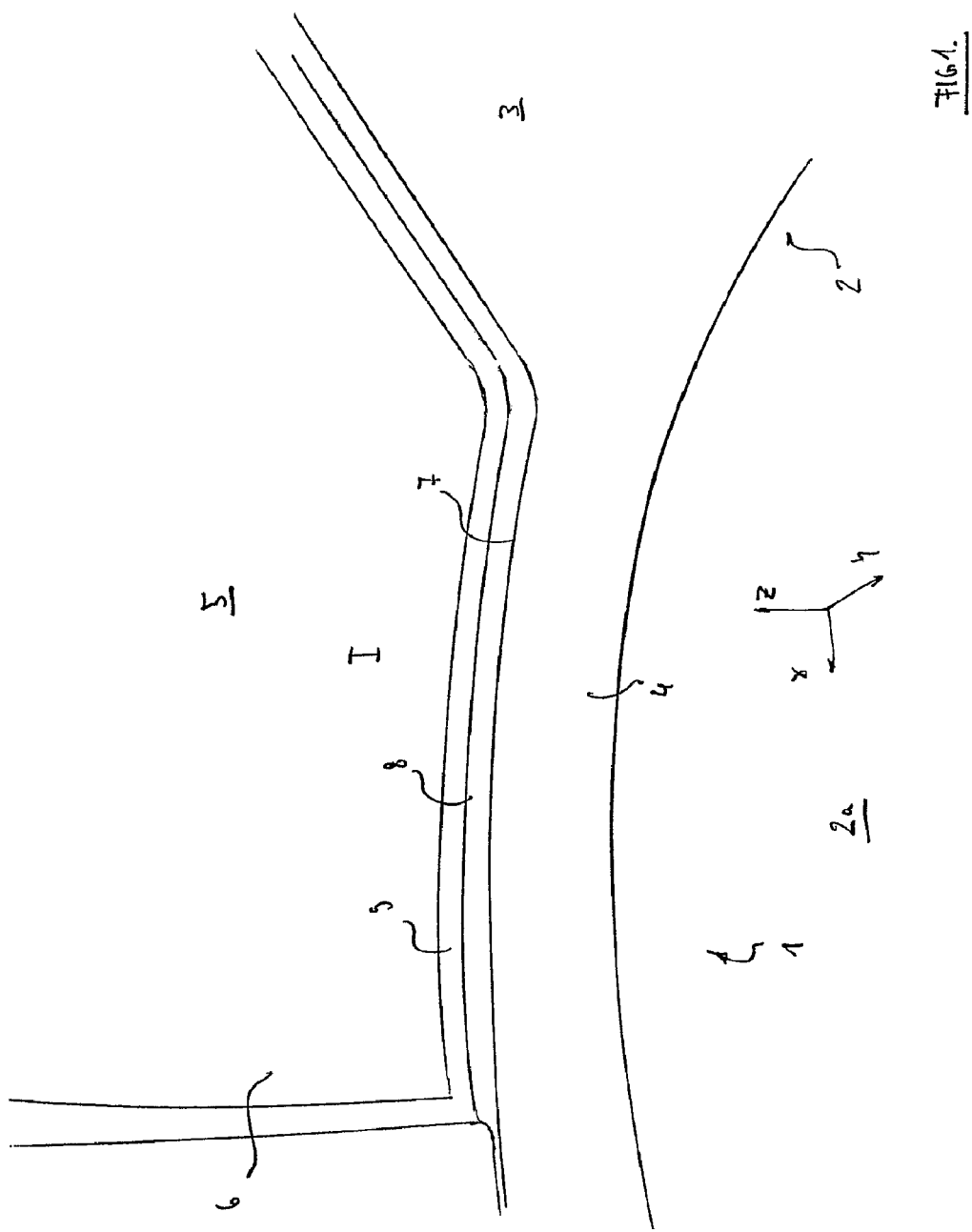
FIGS. 1-3 show perspective views of a first embodiment of a panel device according to the invention, a sliding cover being located in a closed position and/or ventilation position and/or open position.
Figure 2:
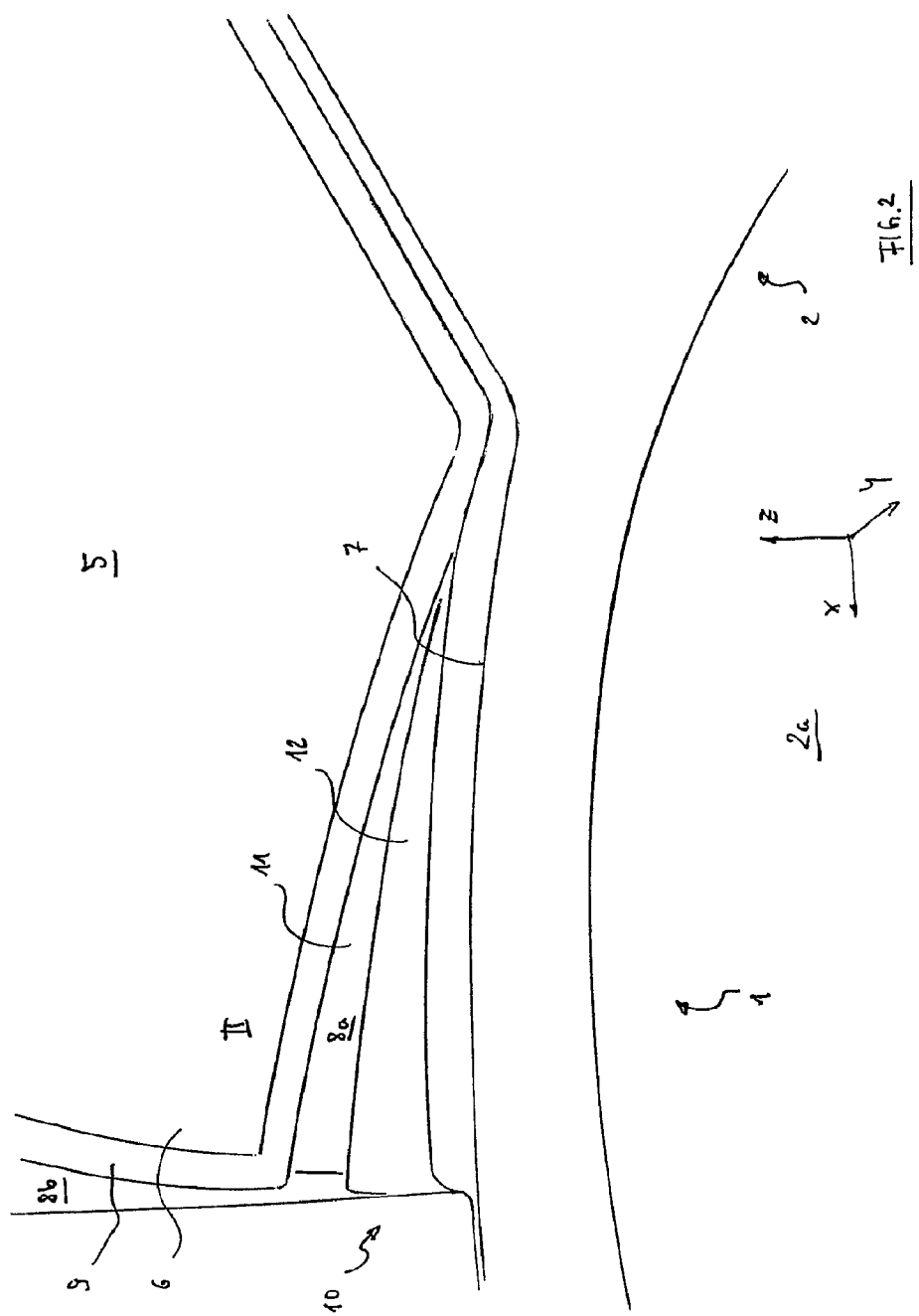
Figure 3:
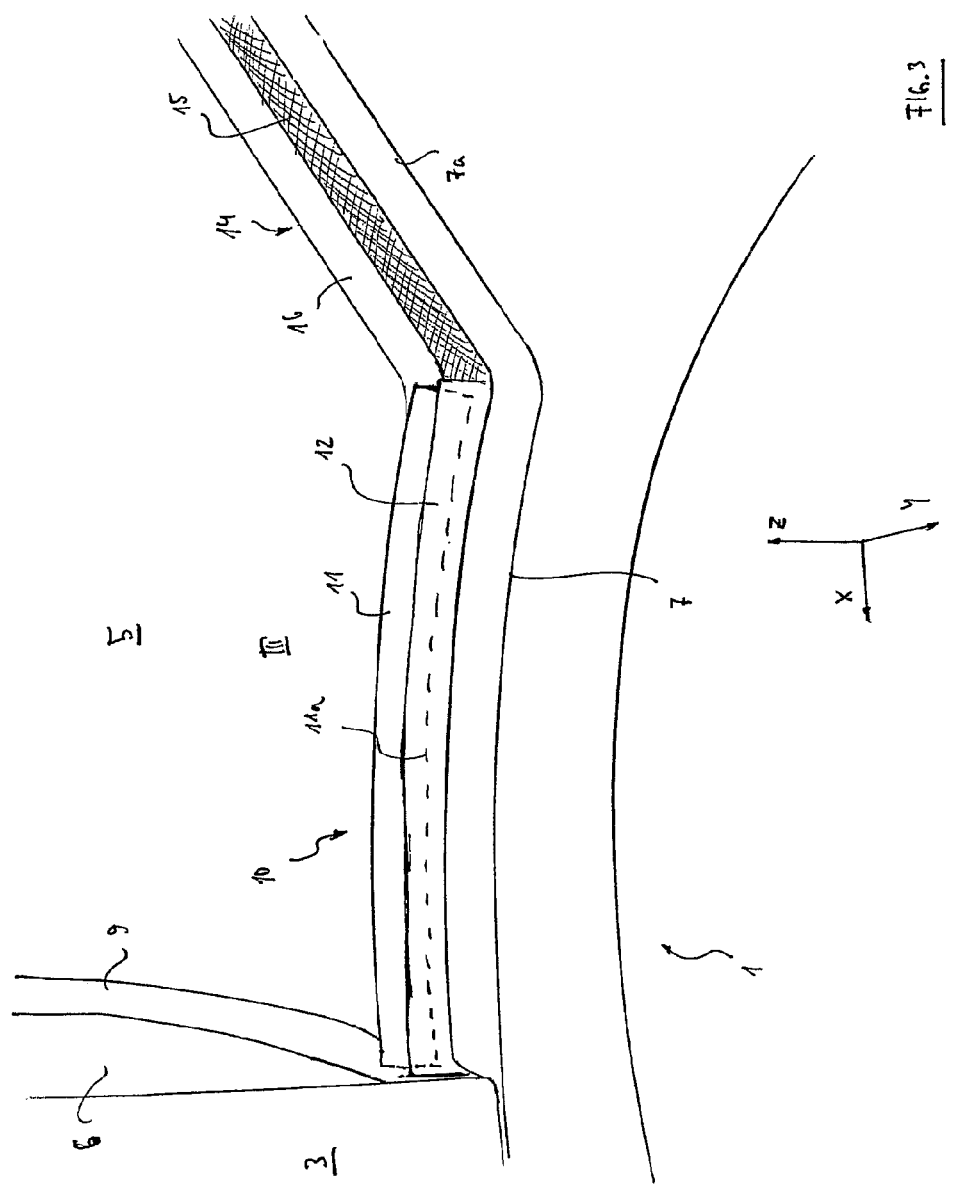

FIGS. 1-3 show perspective views of a first embodiment of a panel device 10 according to the invention, a sliding cover 6 being located in a closed position I and/or ventilation position II and/or open position III.

In FIG. 1 a sliding roof arrangement 1 of a vehicle 2 is shown with a roof 3, which has a roof frame 4, as might be visible for an observer in the interior of the vehicle. The roof frame 4 is provided with an opening 5, in which a sliding cover 6 is arranged. In the roof frame 4, moreover, a frame 7 of the sliding roof arrangement 1 is attached, which encompasses the opening 5. The sliding cover 6 is in the closed position I, in which it closes the roof opening 5, and fixedly rests on an acoustic seal 8, which is attached to the frame 7. The sliding roof arrangement 1 is designed as a sliding roof module. Moreover, a foam cladding 9 is provided for reinforcing the sliding cover 6 and the damping thereof against vibrations between the sliding cover 6 and the frame 7.

In FIG. 2 the sliding cover 6 is located in the ventilation position II, the sliding roof arrangement 1 having gaps 8a and 8b between the frame 7 and the sliding cover 6. The gap 8a is, however, covered by a panel element 11 of the panel device 10, which is attached in the frame 7 of the sliding roof arrangement 1. The panel element 11 is in this case upwardly pivoted out of a receiver element 12. The panel element 11 has a substantially rectangular, flat and elongate design.

Body parts are prevented from being trapped in the gap 8a by the deployed panel element 11. Moreover, a view of a device 2b (see FIG. 7) for adjusting the position of the sliding cover 6 is blocked by means of the panel element 11 and thus improves the appearance as it is perceived by a vehicle passenger.

In FIG. 3, the sliding cover 6 is located in the open position III and is moved back outwardly over the roof (in the x-direction). The panel element 10 is fully deployed in this position of the sliding cover 6. On the front side of the vehicle (counter to the x-direction) on a front frame 7a of the frame 7, a wind deflector 14 is shown with a wind deflector net 15 and a deployment element 16 in a position deployed relative to the vehicle roof 3.

Figure 4:
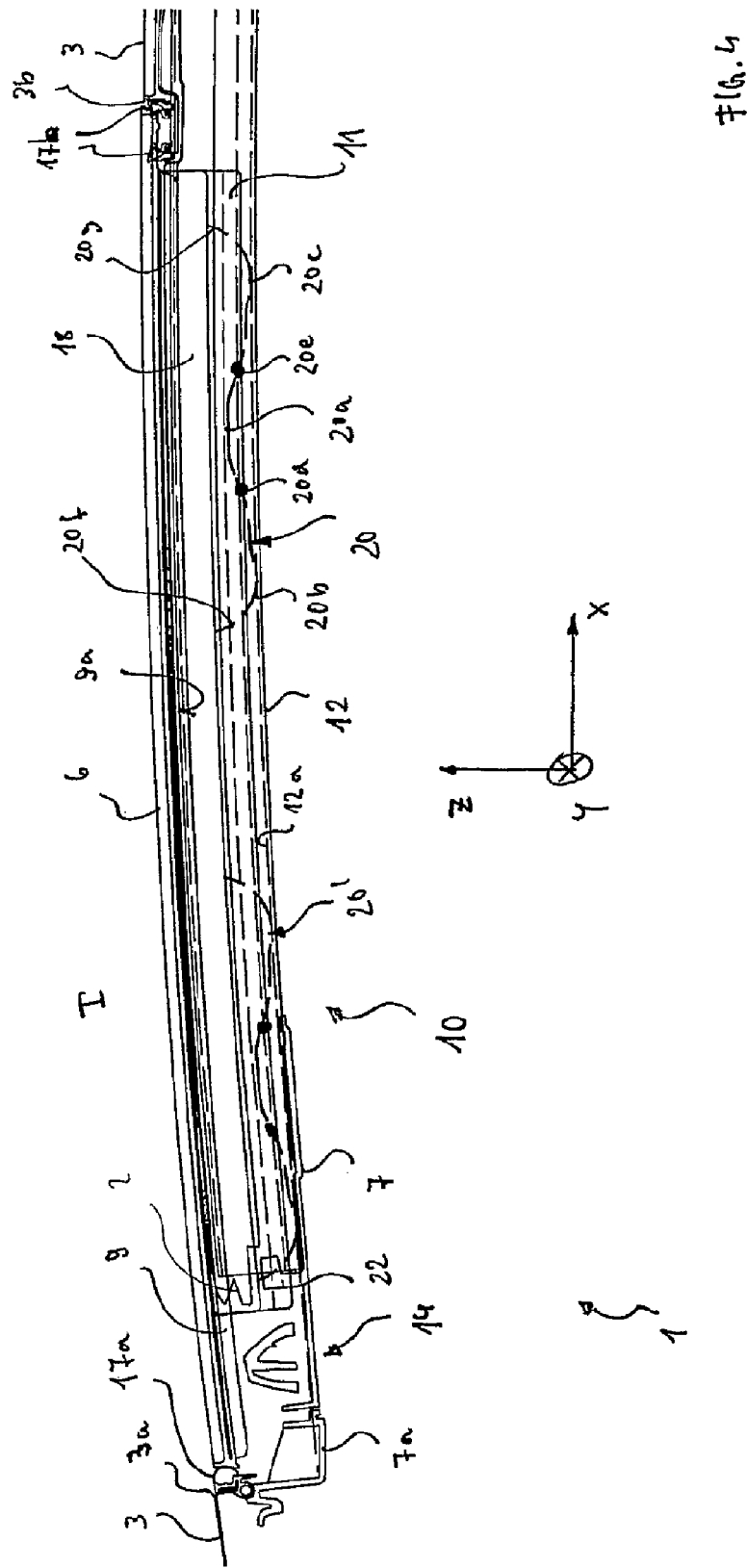
FIGS. 4-6 show side views of the first embodiment of FIGS. 1, 2 and/or 3.
Figure 5:
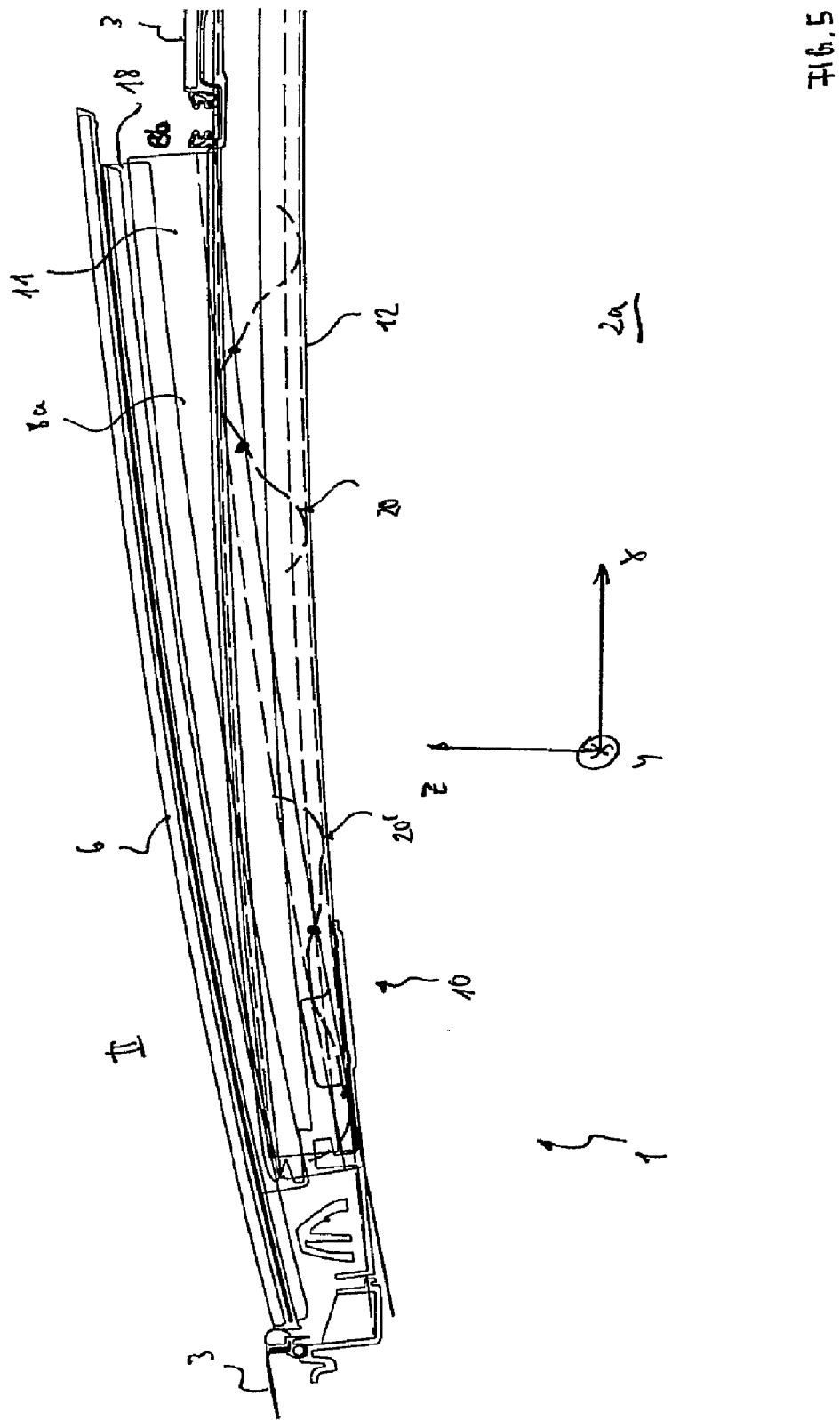
Figure 6:
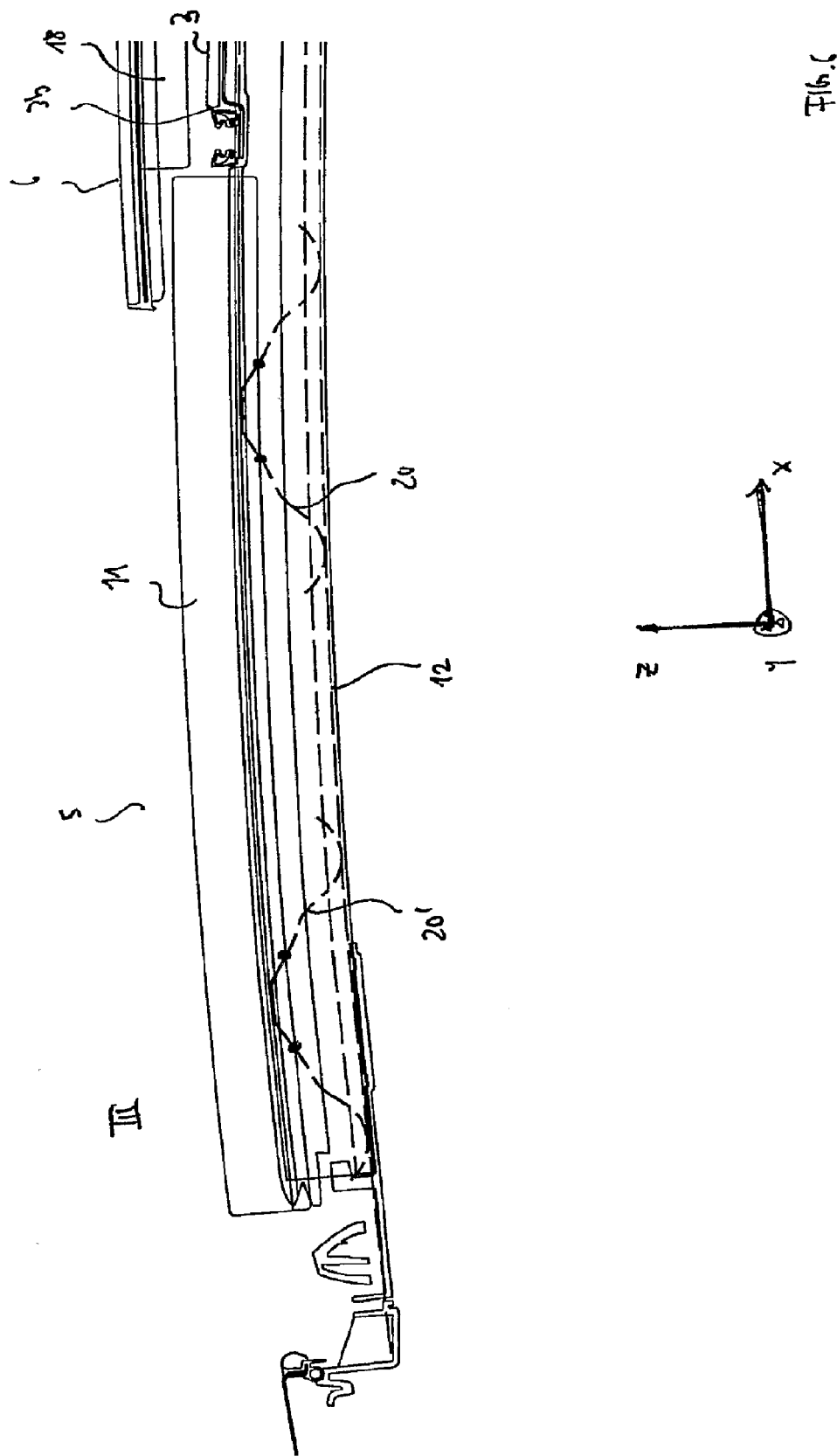

FIGS. 4-6 show side views of the first embodiment of FIGS. 1, 2 and/or 3.

In FIG. 4, the sliding cover 6 is located in the closed position I. In this case, it bears against the front side of the vehicle (i.e. counter to the x-direction) on a front roof edge 3a by means of a seal 17a. The wind deflector 14 is located in a retracted position. To the rear, the sliding cover is sealed by means of a further seal 17a to a rear roof flange 3b.

A further panel element 18 is foamed onto the underside of the sliding cover. The further panel element 18 is approximately configured as a rectangular, elongate, flat plate, and has a cross section tapering toward the roof. The further panel element 18 extends in the closed position of the sliding cover 6, into the receiver element 12, which is configured integrally with the frame 7 of the sliding roof arrangement 1.

In the closed position I of the sliding cover 6, the panel element 11 is pressed against the underside 9a by means of bow springs 20. The bow springs 20 are fastened with their central portion 20a, by injection-molding in the panel element 11. Moreover, the bow spring 20 has two portions 20b and 20c which are located externally relative to the internal portion 20a, which partially bear in a resilient manner against the base 12a of the receiver element 12. The positions at which the external portions 20b, 20c emerge from the injection-molded portion 20a are identified by the reference numerals 20d and 20e. In this pretensioned position of the bow springs 20, 20', their ends 20f and 20g project into a groove 11a (shown in FIG. 7). The bow springs 20, 20 have a substantially cap-shaped construction and are arranged spaced apart from one another in the x-direction between two limbs 12b, 12c (shown in FIG. 7) of the U-shaped receiver element 12. In diameter, the bow springs have a wire thickness of X to XX millimeters.

In a front region (counter to the X-direction) guide means 22 are provided which prevent a displacement of the panel element 11 in the x-direction (and/or counter to the x-direction). For example, such a guide means 22 may be configured as a positive guide, a pin facing in the y-direction being guided in a groove facing in the z-direction. A pivoting of the panel element 11 is permitted in such a design of the guide, the displacement in the z-direction of the panel element 11 being additionally permitted.

In FIG. 5 the sliding cover 6 is located in the ventilation position II. The sliding cover 6 is located in this case in an oblique position relative to the vehicle roof 3, said sliding cover increasingly lifting off the vehicle roof 3 at the rear side of the vehicle (in the x-direction). In this position, fresh air may penetrate via the rear gap 8b into the vehicle interior 2a. The gap 8a on both sides of the sliding cover is, in this position of the sliding cover 6, of approximately triangular configuration, the triangle widening toward the rear side of the vehicle, i.e. in the x-direction. The gap 8a is covered by the panel element 11, which is pivoted by means of the action of the bow springs. In this position, the bow springs 20, 20' ensure that the panel element 11 remains in contact with the underside 9a.

Figure 8:
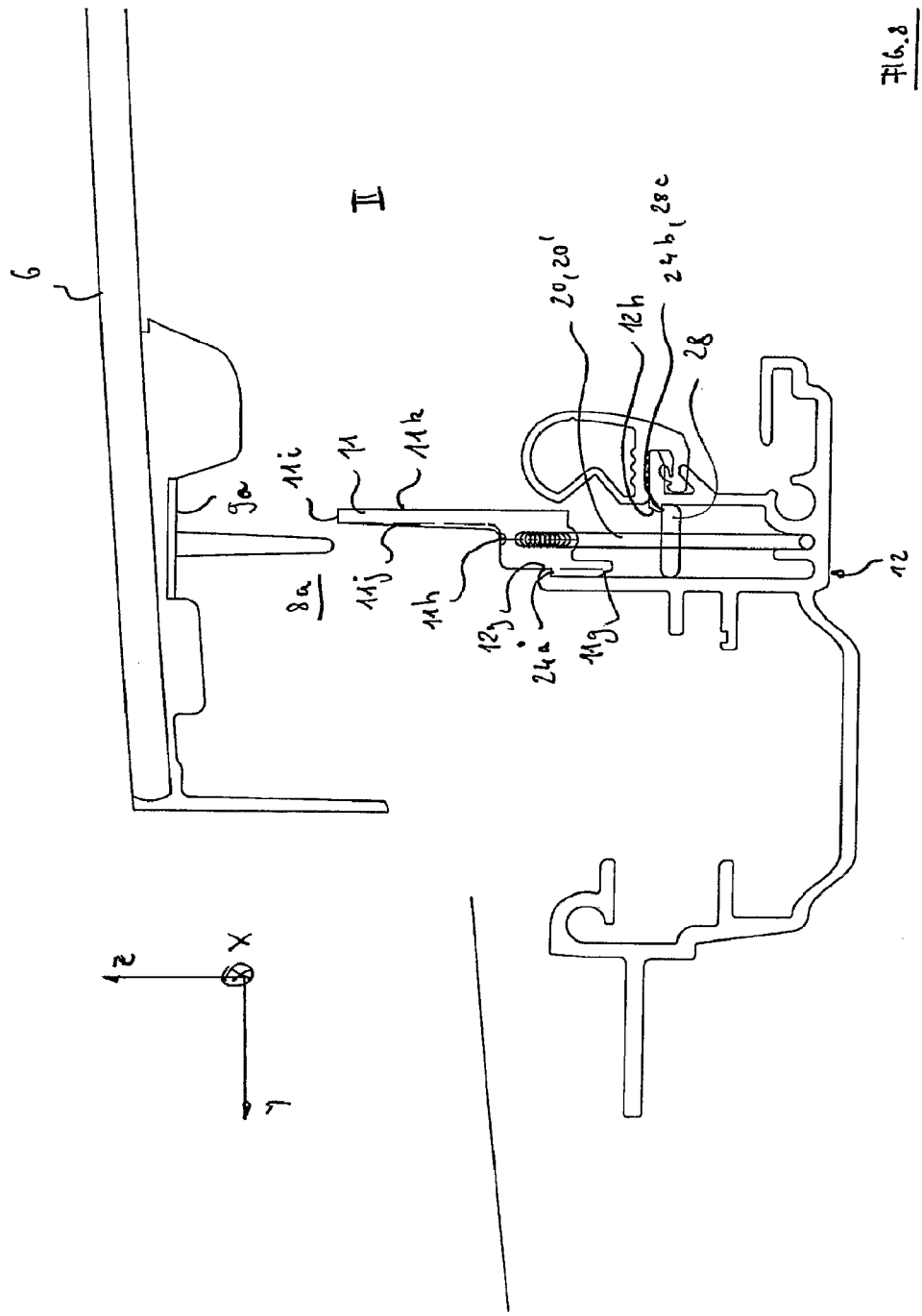

In FIG. 6, the sliding cover 6 is located in the open position III, it being moved back via the rear roof flange 3b over the roof 3 (in the x-direction) and opening up the opening 5. By means of the bow springs 20, 20', the panel element is brought into a position which is substantially horizontal to the receiver element 12. In this position of the panel element 11, said panel element bears against limiting elements 24a, 24b in a pretensioned manner (as shown in FIG. 8). The pretensioning by means of the bow springs 20, 20' ensures that the panel element 11 in this open position of the sliding cover 6 may be deployed at a uniform height.

In the at least partially deployed position (II and I-II) of the panel element 11, the panel element 11 is subjected to forces acting in the y-direction (and in the opposing direction). Such forces may, for example, result from an acceleration of the vehicle, a side wind, an inadvertent gripping by vehicle occupants but also from a distortion of the panel element itself, for example by the effect of the sun. As a result, such forces may cause a displacement of the panel element 11 in the y-direction, a warping thereof in the Y-direction or a distortion thereof in the x-direction. In a forward movement of the sliding roof 6 from the open position III into the ventilation position II this would then lead to collisions between the panel element 11 and elements formed on the sliding cover 6, such as for example the further panel element 18. Therefore, suitable force absorbing means 26 may be provided for absorbing such forces acting in the y-direction (and in the direction opposing the y-direction), as shown in FIGS. 7 to 20.

Figure 7:
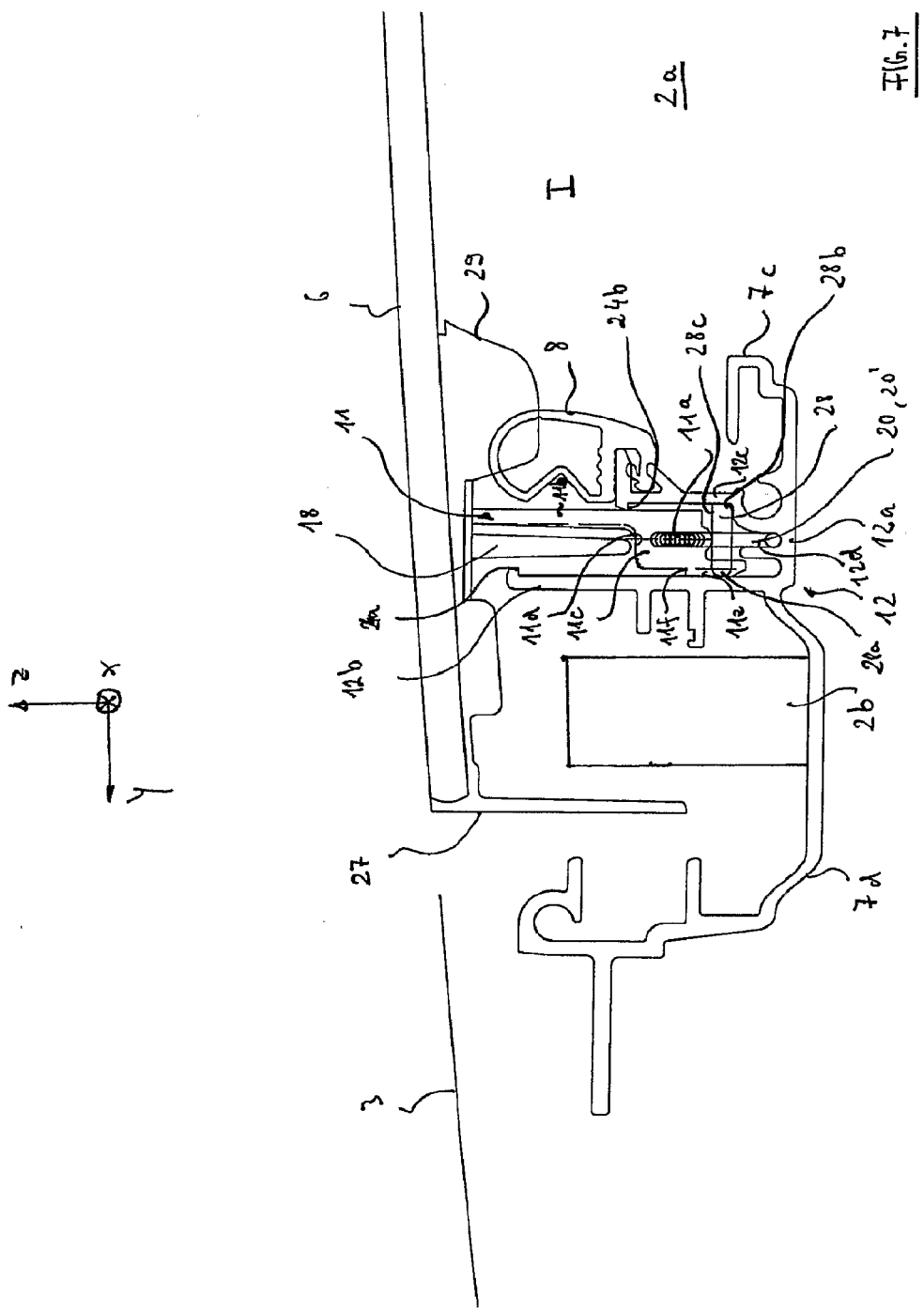
FIGS. 7-8 show sectional views of a second embodiment of a panel device according to the invention, a sliding cover being located in a closed position and/or ventilation position.

FIGS. 7-8 show sectional views of a second embodiment of a panel device 10 according to the invention, a sliding cover 6 being located in a closed position I and/or ventilation position II.

The sliding cover 6 is provided with an external panel 27, which further improves the aerodynamics of the sliding cover in the ventilation position II. In the closed position I of the sliding cover 6, a foam cladding 28 is pressed onto the acoustic seal 8, and thus seals the interior 2a of the vehicle 2 relative to wind noise outside the vehicle.

The panel element 11 has an L-shaped cross section. This cross section comprises a long limb 11b and a short limb 11c, a shoulder 11d being configured between the short limb 11c and the long limb 11d. This construction allows a partial penetration of the further panel element 18 into the receiver element 12. The panel element 11 has a foot-shaped projection 11e, which bears displaceably on the first limb 12b of the receiver element 12. Moreover, the panel element 11 slidably bears with its long limb 11b on a surface of the stop 24b.

Moreover, the panel element 11 has the groove 11a inside its short limb 11c. In the groove 11a the bow springs 20, 20' are injection-molded at their central portion 20a. The portions 20b and 20c of the bow springs 20, 20' engage in a further groove 12d in the receiver element 12. The bow springs 20, 20' are respectively guided through one or more spacers 28. The spacers 28 are fixedly attached to the wire of the compression bow springs 20, 20'.

The spacers 28 have opposing sliding surfaces 28a and 28b which slidably bear against the limbs 12b and/or 12c. Moreover on the spacer 28 a contact surface 28c is provided, which is intended to come into engagement with the stop 24b of the receiver element 12, when the panel element 11 is moved in the z-direction.

Moreover, the shoe-shaped projection 11e on the panel element 11 has a contact surface 11f which is provided to come into engagement with the stop 24a of the receiver element 12, when the panel element 11 is moved in the z-direction.

The short limb 11c of the panel element 11 is designed as a snap hook. Additionally, insertion bevels 11g, 12g, 12h are configured on the shoe-shaped projection 11e and/or the first and/or the second limb 12b, 12c. Moreover, a recess 11h is provided on the short limb 11c of the panel element 11, which is provided to facilitate bracing, i.e. an elastic deformation of the short limb 11c (see FIG. 8). As a result, a very simple assembly of the panel element 11 may take place by means of resilient bracing between the limbs 12b and 12c.

In FIG. 8, the sliding cover 6 is in the ventilation position II. The panel element 11 is released at its upper end 11i, whilst the sliding cover 6 moves from the closed position I into the ventilation position II. By means of the effect of the bow springs 20, 20', the panel element 11 is displaced in the z-direction. In this case, the panel element 11 is slidably guided on its shoe-shaped projection 11e along the first limb 12b of the receiver element 12. Moreover, the spacer 28 guides the movement of the springs 20, 20'. If the stops 24a and 24b respectively come into engagement with the contact surfaces 11f and/or 28c, the movement of the panel element 11 stops in the z-direction.

This type of guide makes it possible that a portion of the panel element 11, as that shown in FIG. 8, is already in the deployed position (II), whilst a portion of the panel element 11, which is located further on the front side of the vehicle (counter to the x-direction), is still in abutment with the underside 9a of the sliding cover 6 and not yet in engagement with the stops 24a and 24b.

The force absorbing means for absorbing a force in the y-direction, i.e. perpendicular to the surfaces 11j, 11k are, as a result, formed by the spacer 28 and/or bearing surfaces 11e, 11k of the panel element.

The frame 7 of the sliding roof arrangement 1 has a portion 7c for receiving a sun shade and/or a sliding roof top. The portion 7d of the frame is configured for receiving the device 2b for moving the sliding cover 6 into the closed position I, ventilation position II and open position I-II.

FIGS. 9 to 20 show merely variations of the arrangement of the section of FIGS. 7 and 8.

Figure 9:
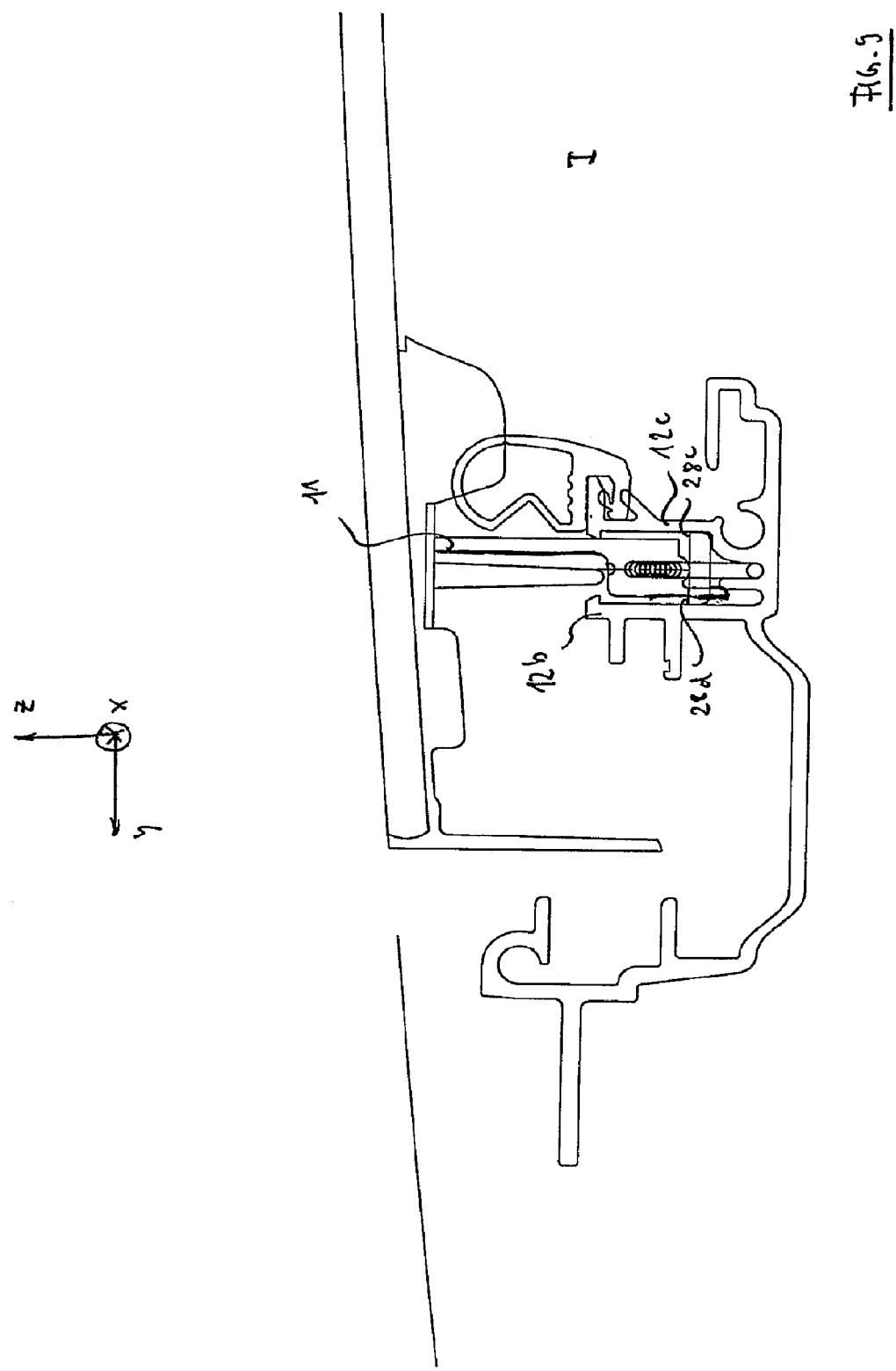
FIGS. 9-10 show sectional views of a third embodiment of a panel device according to the invention, a sliding cover being located in a closed position and/or ventilation position.
Figure 10:
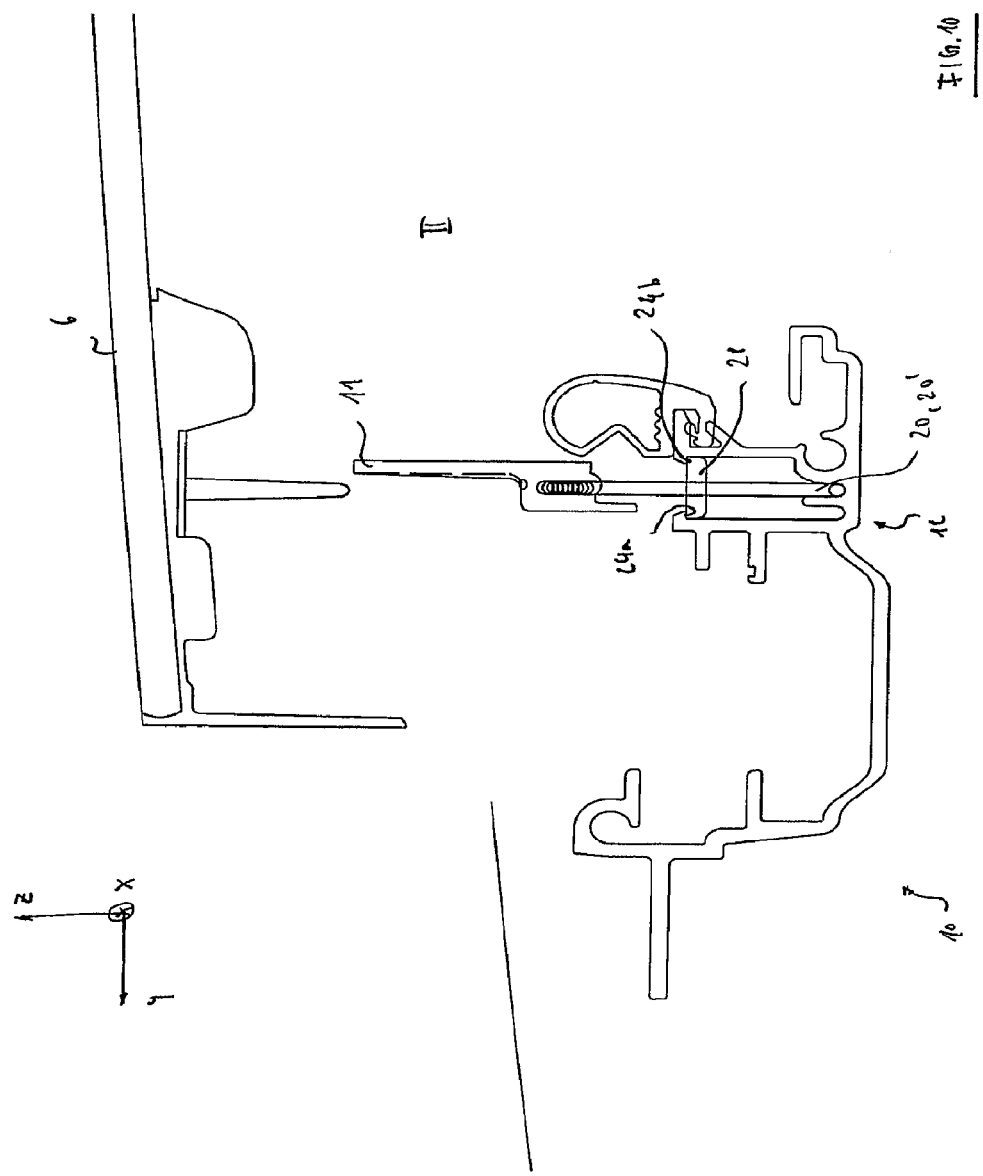

FIGS. 9-10 show sectional views of a third embodiment of a panel device 10 according to the invention, a sliding cover 6 being located in a closed position I and/or ventilation position II.

In contrast to FIG. 7, the limbs 12b and 12c are of the same length and both configured to be shorter. Moreover, no shoe-shaped projection 11e is provided on the short limb 11c of the panel element 11. This results in that the panel element 11 may be deployed via the limbs 11b and 11c of the receiver element 12 and a limiting of its movement only takes place via the spacer 28, which comes into engagement by means of its surfaces 28c and 28d with the stops 24a and 24b. This arrangement has the advantage that the receiver element 12 may be configured to be smaller and thus to be more space-saving.

Figure 11:
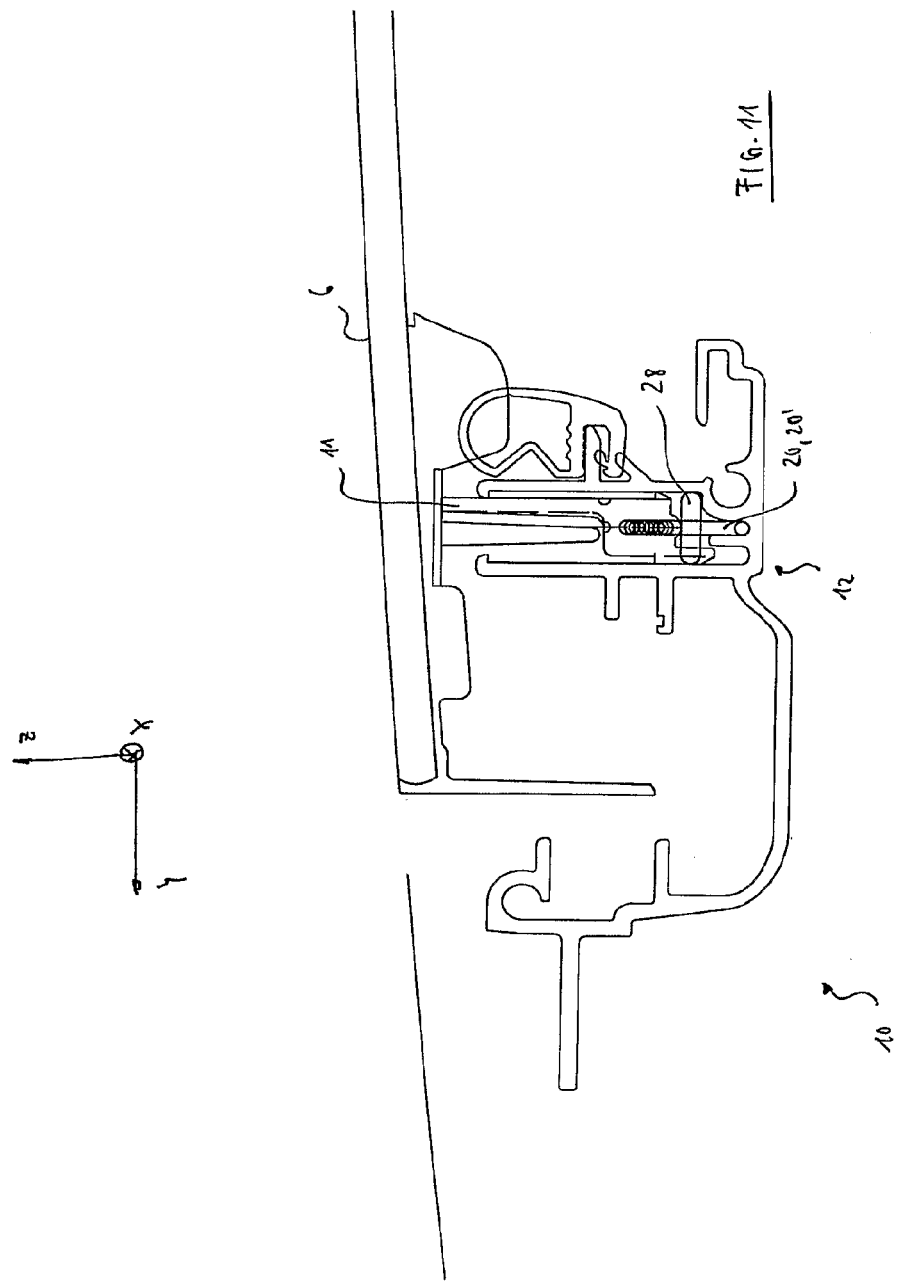
FIGS. 11-12 show sectional views of a fourth embodiment of a panel device according to the invention, a sliding cover being located in the closed position and/or ventilation position.
Figure 12:
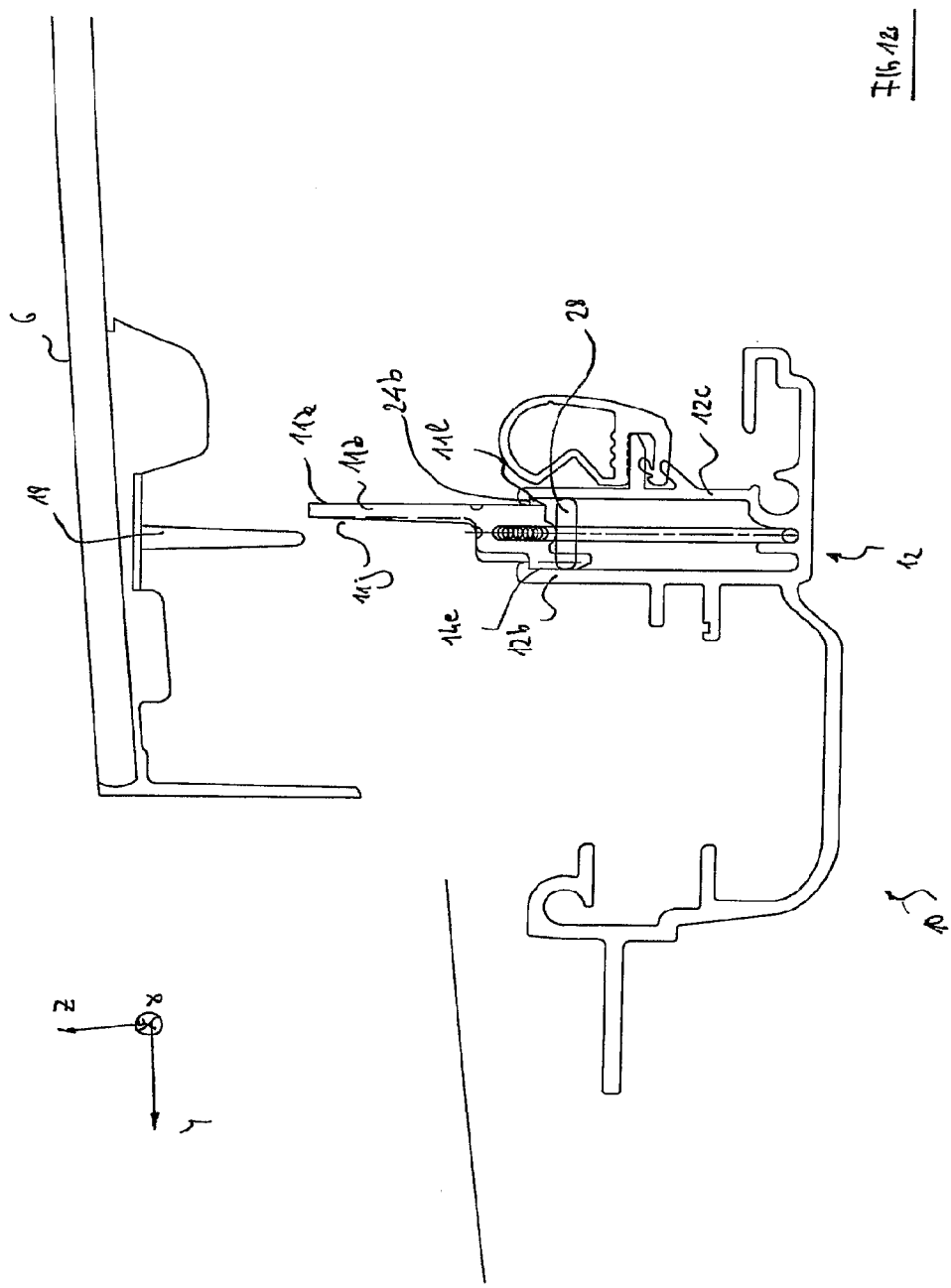

FIGS. 11-12 show sectional views of a fourth embodiment of a panel device 10 according to the invention, a sliding cover 6 being in a closed position I and/or ventilation position II.

In contrast to the embodiment in FIGS. 7 and 8, the two limbs 12b and 12c are configured to be the same length. Moreover at the lower end of the long limb 11b a projection 11l is provided which comes to bear against the stop 24b when the panel element 11 is deployed, and limits the movement thereof in the z-direction.

In this embodiment, a force which acts perpendicular to the surfaces 11j and 11k (Y-direction) may occur by force absorbing means in the form of the foot-shaped projection 11e and the spacer 28.

Figure 13:
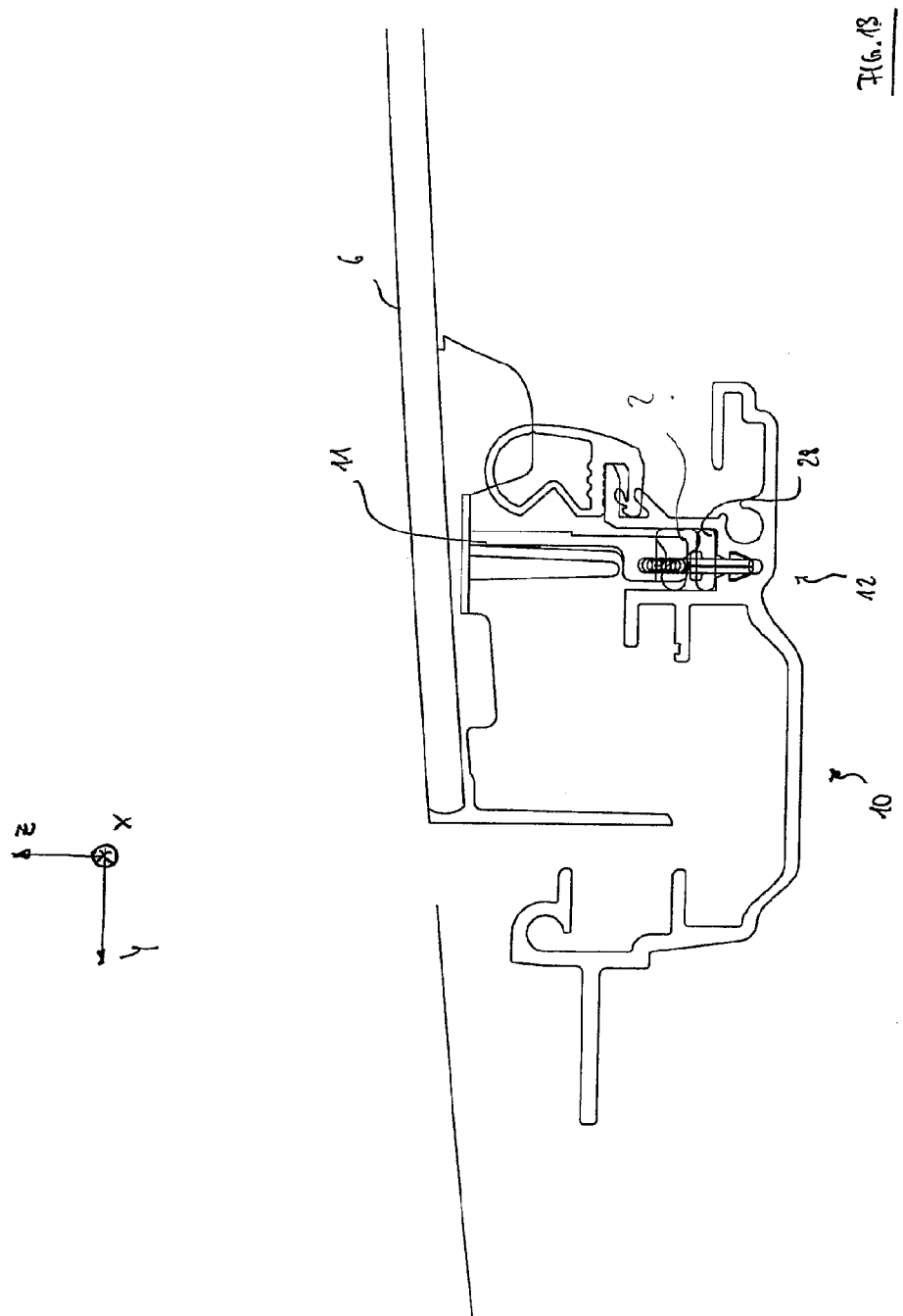
FIGS. 13-14 show sectional views of a fifth embodiment of a panel device according to the invention, a sliding cover being located in a closed position and/or ventilation position.
Figure 14:
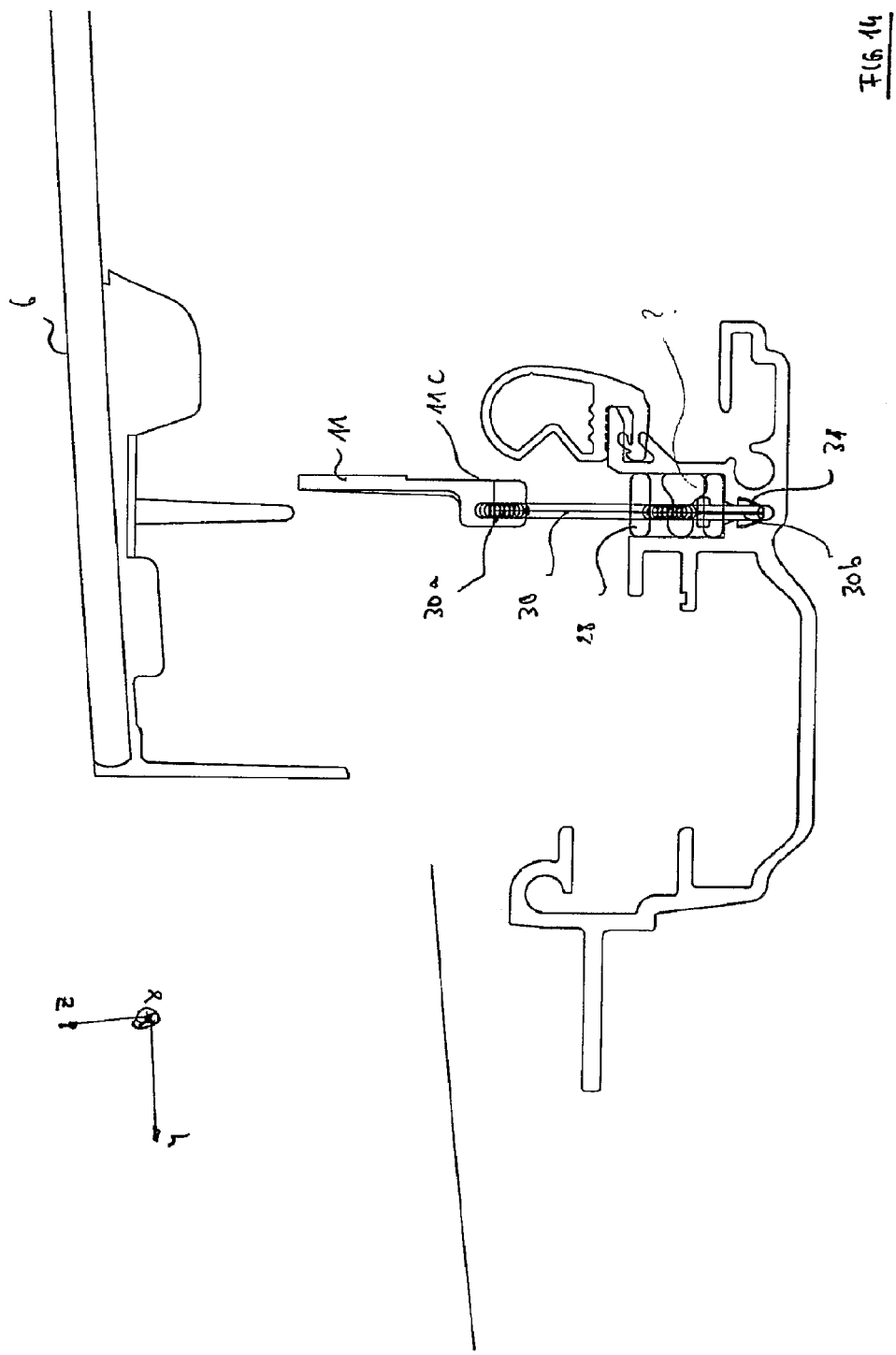

FIGS. 13-14 show sectional views of a fifth embodiment of a panel device 10 according to the invention, a sliding cover 6 being located in a closed position I and/or ventilation position II.

In contrast to the previous embodiments, the limiting of the movement of the panel element 11 in the z-direction takes place by a flexible strip 30. The strip 30 is at its one end 30a fastened to the short limb 11c of the panel element 11. At its other end 30b, the strip is fastened to a clip 31. The clip 31 is resiliently braced in a corresponding recess on the base 12a of the receiver element 12. The force absorption in the y-direction is carried out merely by the spacer 28.

Figure 15:
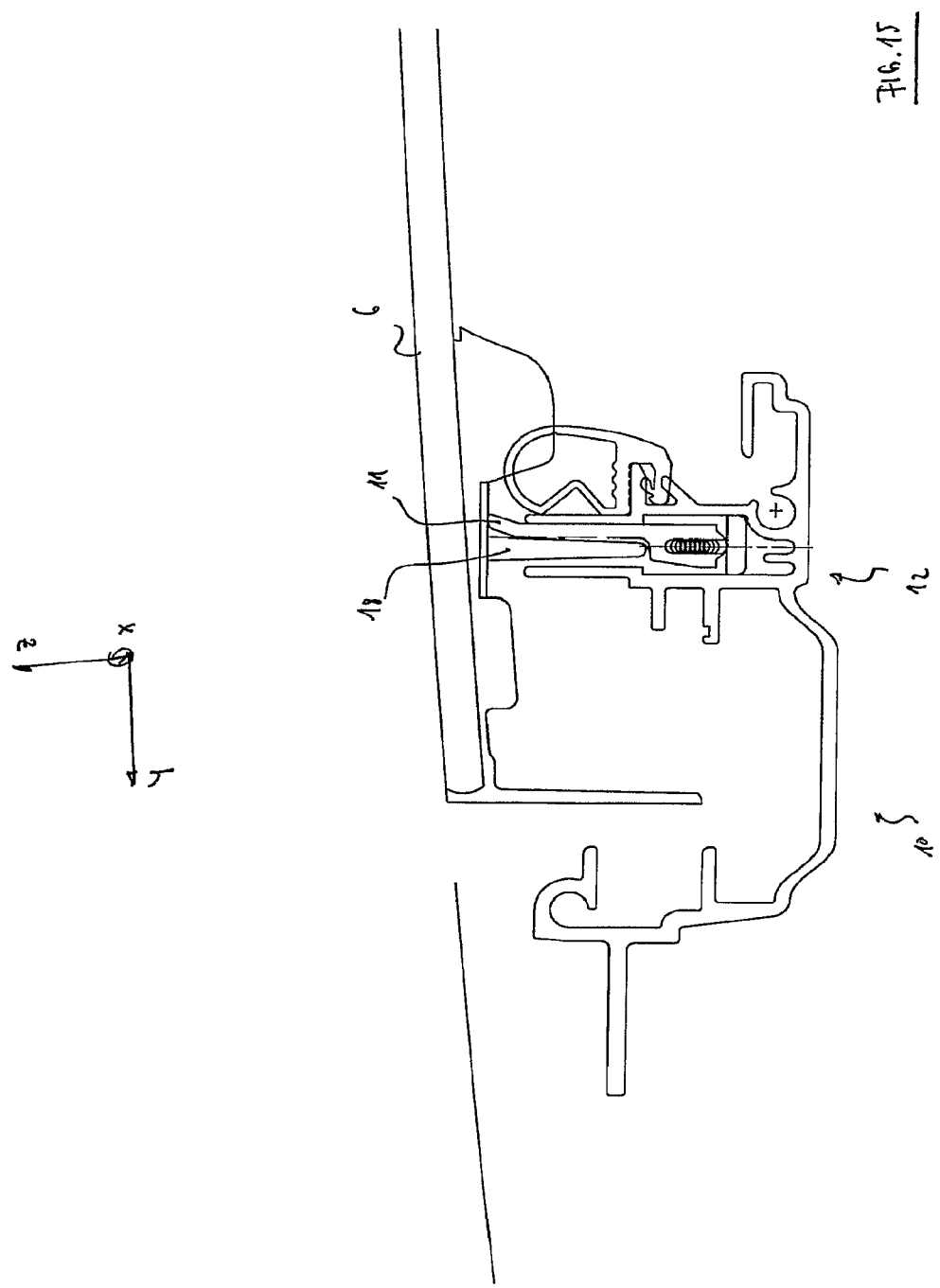
FIGS. 15-16 show sectional views of a sixth embodiment of a panel device according to the invention, a sliding cover being located in a closed position and/or ventilation position.
Figure 16:
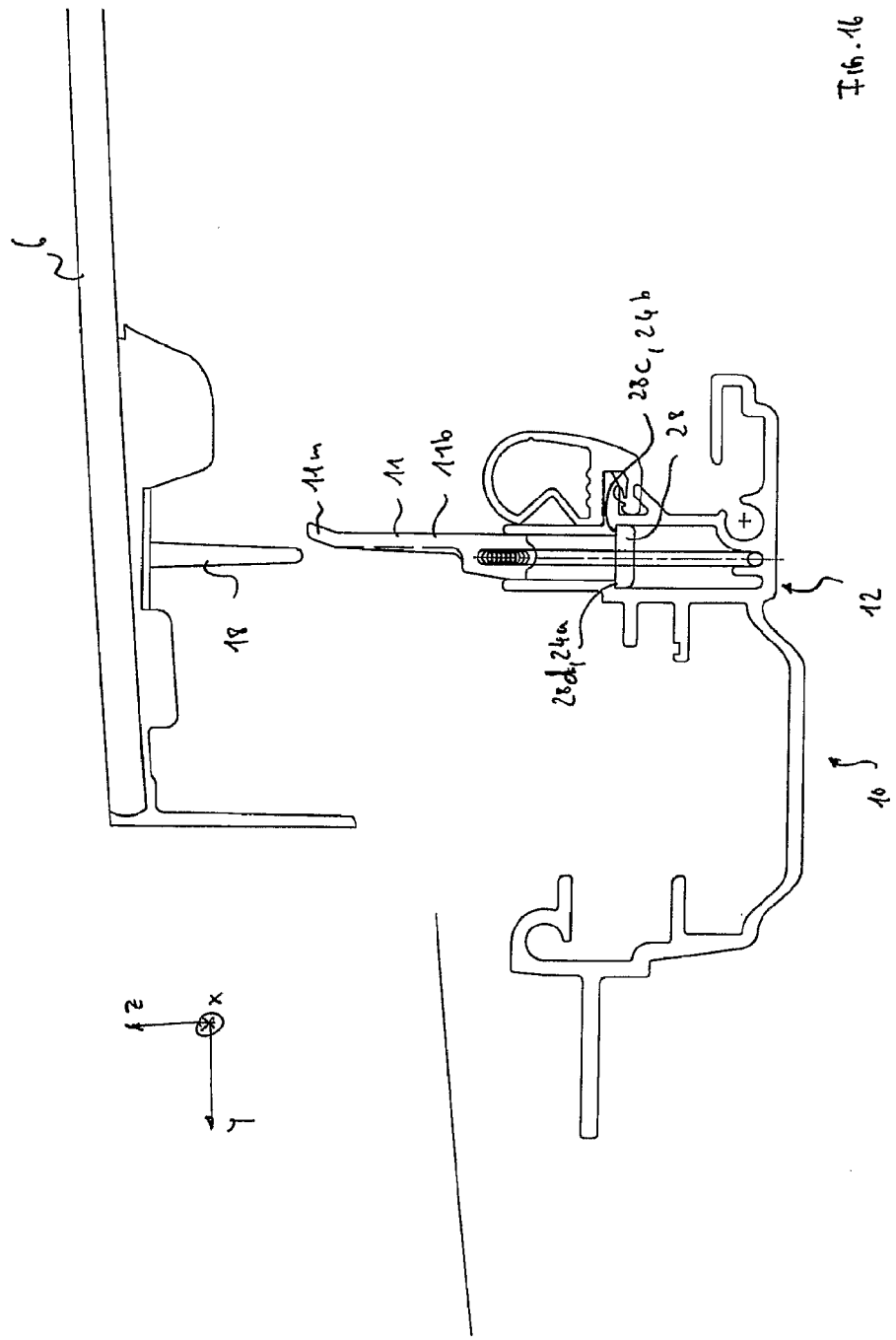

FIGS. 15-16 show sectional views of a sixth embodiment of a panel device 10 according to the invention, a sliding cover 6 being in a closed position I and/or ventilation position II.

The limiting of the movement of the panel element 11 in the z-direction takes place merely via the contact surfaces 28c, 28d of the spacer 28 on the corresponding stops 24a and/or 24b of the receiver element 12. An upper portion 11m of the long limb 11b of the panel element 11 is curved in the y-direction. This curvature is preferably 0.5 to 20 degrees relative to the z-direction. The panel element 11 and the further panel element 18 are in this case spaced apart from one another in the y-direction, such that in the closed position of the sliding cover 6, the further panel element 18 presses against the panel element 11. As a result, there is the advantage that the further panel element 18 and the panel element 11 slide on one another without rattling and, with the sliding cover 6 closed, bear against one another without rattling. As a result, an improvement to the acoustics in the vehicle may be achieved.

Figure 17:
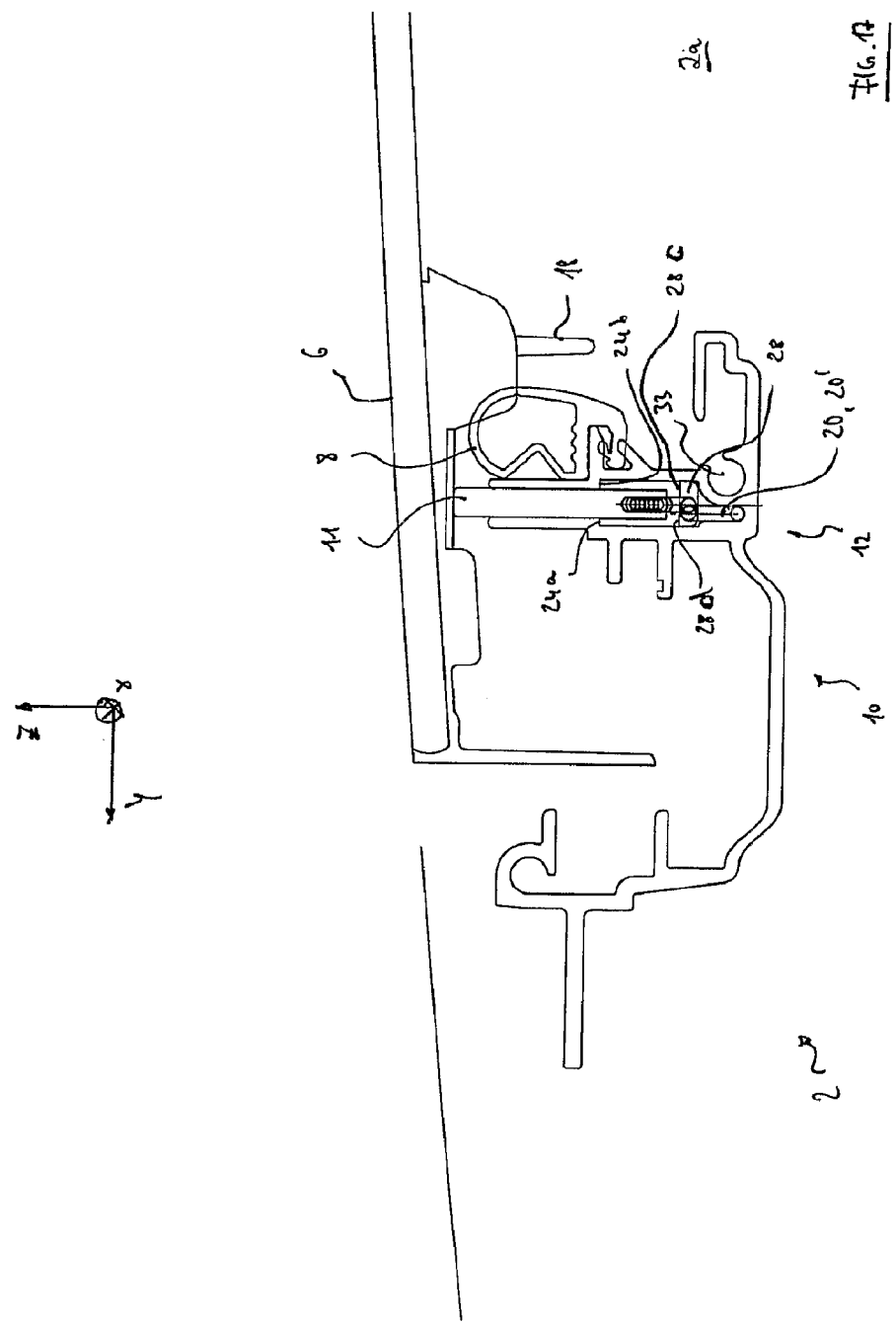
FIGS. 17-18 show sectional views of a seventh embodiment of a panel device according to the invention, a sliding cover being located in a closed position and/or ventilation position.
Figure 18:
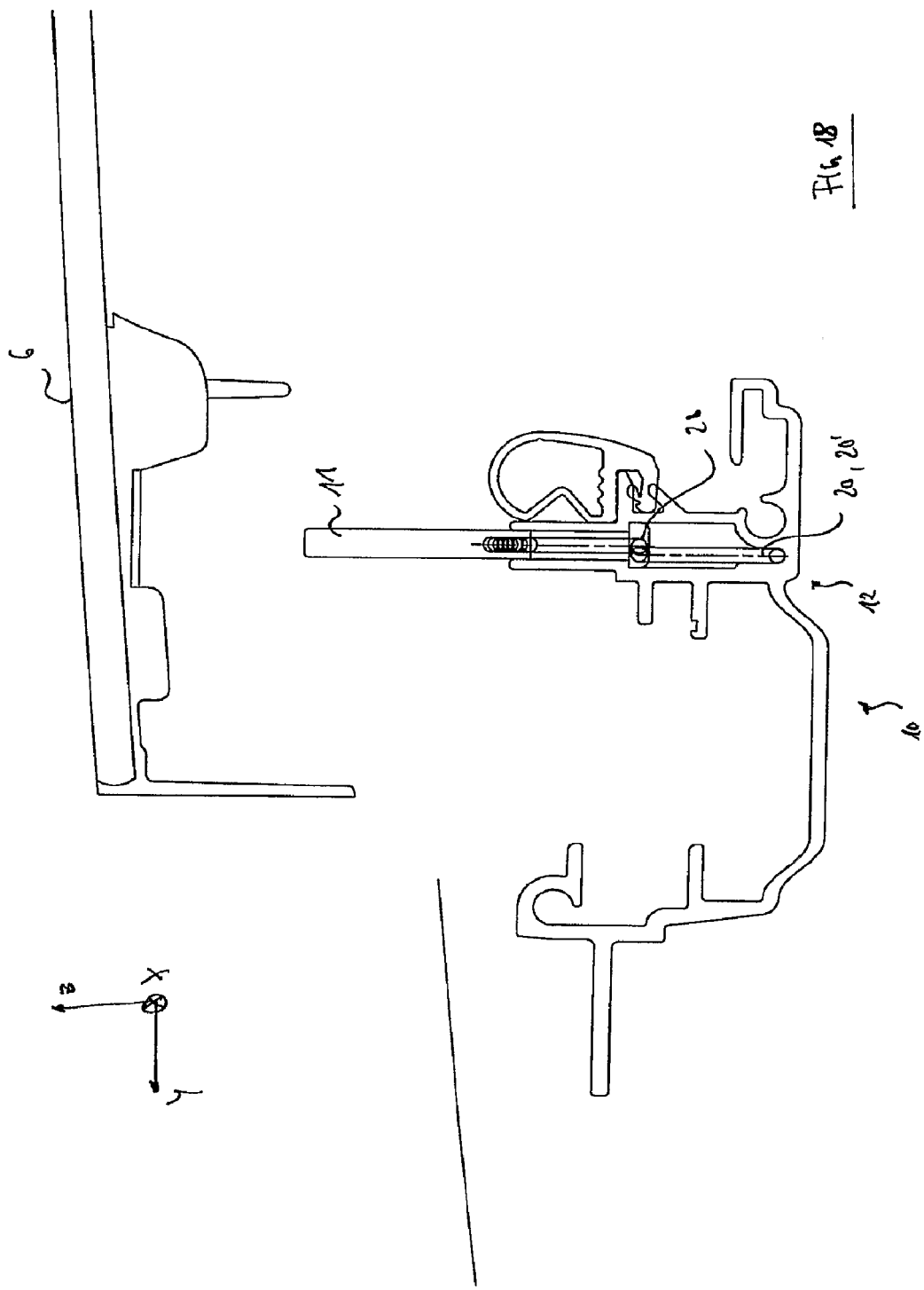

FIGS. 17-18 show sectional views of a seventh embodiment of a panel device 10 according to the invention, a sliding cover 6 being located in a closed position I and/or ventilation position II.

In contrast to the above embodiments, the cross section of the panel element 11 is designed to be elongate and rectangular. The bow spring 20, 20' is designed to be bent. This means that the bow spring 20, 20' extends initially in the x-z plane, then bends into the y-z plane for a relatively short portion and then extends again in the x-z plane. As a result, there is the advantage that the bow spring 20, 20' is not arranged centrally as in the above embodiments on the base 12a of the receiver element 12 but is offset counter to the y-direction and thus provides space for an adjacent cable channel 33, which extends in the frame 7. A limiting of the movement of the panel element 11 in the z-direction takes place via the surfaces 28c, 28d of the spacer 28, which come to bear against the contact surfaces 24a, 24b of the receiver element 12.

Moreover, the further panel element 18 is no longer arranged such that it extends into the receiver element 12 in the closed position I of the sliding cover 6 and is arranged adjacent to the panel element 11, as in the above embodiments. In this seventh embodiment the further panel element 18 is arranged further toward the vehicle center (direction counter to the y-direction), preferably adjacent to the vehicle interior 2a.

By means of these features, it is possible to minimize the space required by the sliding roof arrangement 1 in the y-direction. This leads to an enlarged roof opening 2a and increases the drive feel for the passengers.

Figure 19:
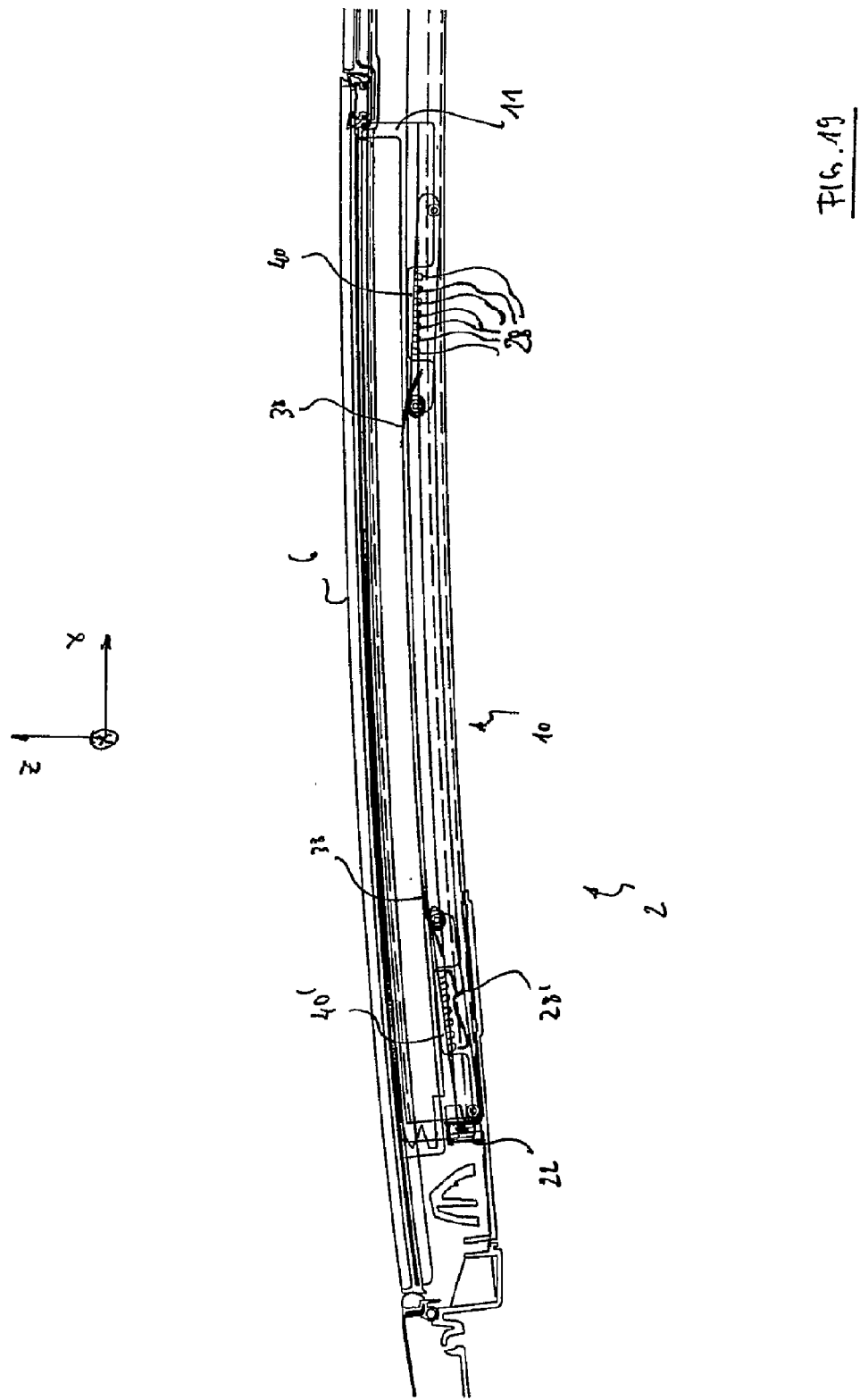
FIGS. 19-20 show side views of an eighth embodiment of a panel device according to the invention, a sliding cover being located in a closed position and/or ventilation position.
Figure 20:
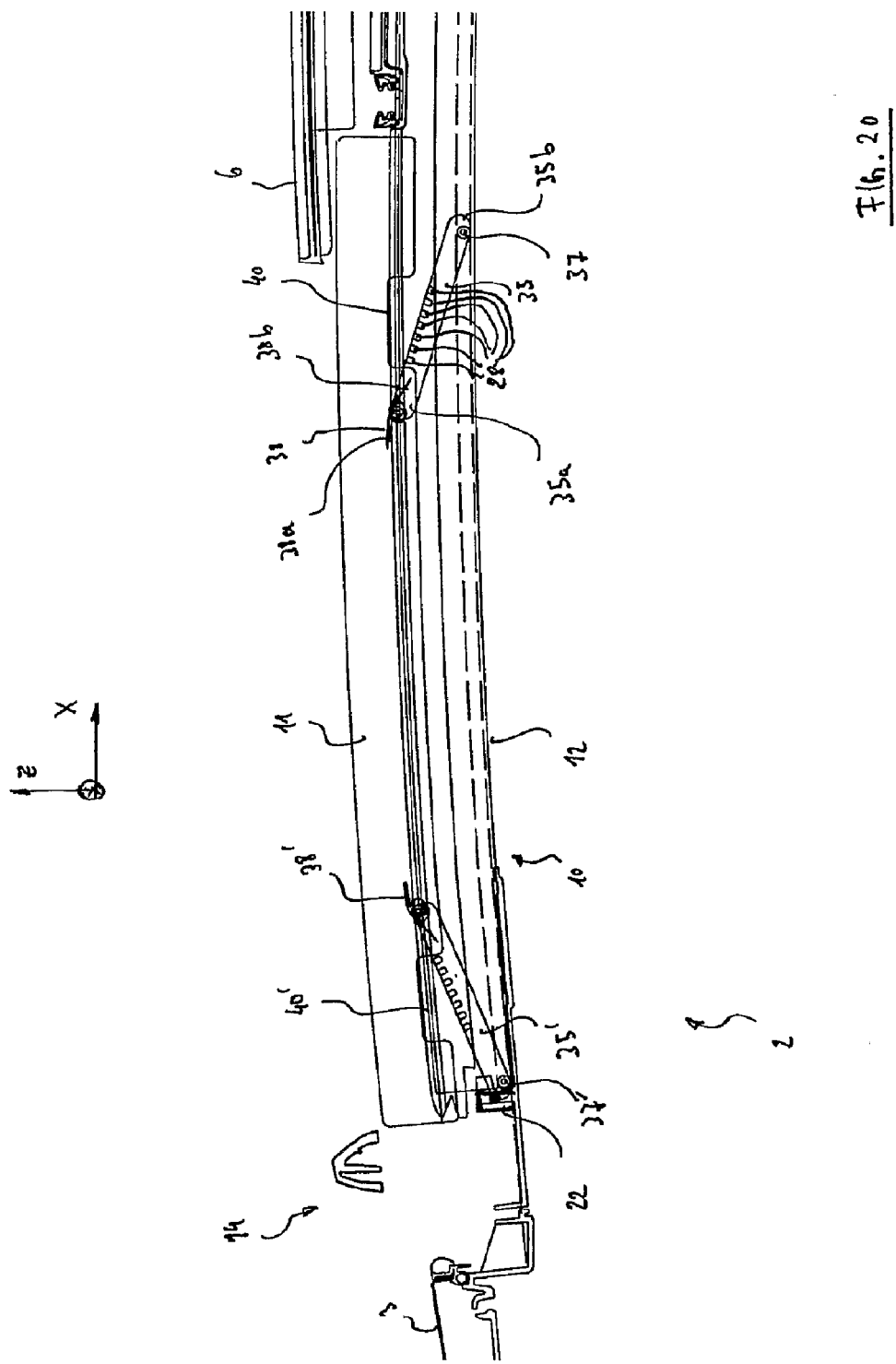

FIGS. 19-20 show side views of an eighth embodiment of a panel device 10 according to the invention, a sliding cover 6 being in a closed position I and/or ventilation position II. In FIGS. 21-22 sectional views of FIGS. 19 and/or 20 are shown.

In contrast to the above embodiments, the panel device 10 in this case has two lever arms 35, 35' instead of the springs 20, 20'.

The lever arms 35, 35' are arranged spaced apart from one another in the longitudinal direction between the limbs 12b, 12c of the receiver element 12, their longitudinal axis being pivotably arranged in the x-z plane. Such a pivoting arm 35, 35' is pivotably attached at its one end 35a in the groove 11a. In this case, a shaft 36, for example, is guided through recesses in the lever arm and the panel element 11. The spacers 28 are fixedly attached to the lever arm 35, 35'. At its other end 35b, the lever arm is provided in the x-direction to be displaceable in the further groove 12d. Preferably, the end 35b has a roller element 37 which simplifies a displacement of the lever arm in the further groove 12d. At the one end 35a, moreover, a spring element 38 is arranged, preferably a torsion spring 38. One end 38a of the torsion spring 38 is fixedly attached, preferably injection-molded, to the panel element 11. The other end 38b of the torsion spring 38 is fixedly connected to the lever arm 35, 35'. The springs 38, 38' are thus provided such that they are pretensioned in the closed position of the sliding cover 6. In this position, the spacers 28 are arranged inside a recesses 40, 40' in the panel element 11. If the sliding cover 6 is moved back, the springs 38 cause a pivoting and/or displacement of the panel element 11 in the z-direction and/or about the x-axis. In this case, the lever arm 35 pivots clockwise and the lever arm 35' counterclockwise.

The spacers 28 as well as the contact surface at the bottom 11e of the panel element 11 allow a force absorption of the panel element 11 in the y-direction. Preferably, the panel element 11 is guided by a guide device 22, as described above.

The springs 38, 38' are configured such that the panel element 11 bears against the stops 24a, 24b in a tensioned manner, when the sliding cover 6 is in the open position III.

The invention is not restricted to the specific design of a panel device shown in the above figures or to a sliding roof arrangement on a vehicle, associated therewith.

Thus, for example, the present inventive idea may also be applied to panoramic roofs or sun roofs in any vehicle or even boats.

Moreover, the geometry of the panel device according to the invention may be modified in numerous ways. For example, the panel element may consist of a plurality of parts.

The invention claimed is:

1. A panel device for a sliding roof arrangement of a vehicle, comprising:
   a panel element for closing a gap between a frame of the sliding roof arrangement and an externally guided sliding cover, when said cover is located in a ventilation position (II),
   a receiver element in which the panel element is at least partially received,
   an actuating element which deploys the panel element relative to the receiver element in a first direction (z); and
   stops to limit panel movement in the first direction, wherein at least one stop is on the actuating element.

2. The panel device for a sliding roof arrangement of a vehicle of claim 1, further comprising
   force absorbing means distinct from the panel element, the receiver element, and the actuating element, by which a force acting in a second direction (y) perpendicular to one side of the panel element and perpendicular to the first direction (z) may be absorbed.

3. The panel device of claim 1, characterized in that the panel element may be deployed from a first position (I) into a second position (II, III) in which at least one portion of the panel element is spaced apart further from the receiver element than in the first position.

4. The panel device of claim 1, characterized in that the panel element is configured as at least one of:
   an integral plate,
   an elongate plate,
   a substantially rectangular plate.

5. The panel device of claim 1, characterized in that the panel element has a substantially L-shaped cross section, the cross section having a long limb and a short limb.

6. The panel device of claim 1, characterized in that the panel element is configured as a part containing plastics or glass fiber-reinforced plastics.

7. The panel device of claim 1, characterized in that the receiver element has a substantially U-shaped cross section, the cross section having two limbs formed by the interior and exterior walls, and a base arranged between the limbs, the panel element in the first position (I) being at least partially arranged between the limbs of the receiver element.

8. The panel device of claim 7, characterized in that the sides of the panel element are arranged substantially parallel to the limbs.

9. The panel device of claim 7 characterized in that the panel element is guided between the limbs.

10. The panel device of claim 2, characterized in that the force absorbing means guide the actuating element, the panel element, or both the actuating element and the panel element in the first direction (z).

11. The panel device of claim 2, characterized in that the force absorbing means have at least one spacer which is displaceably arranged, bearing against opposing limbs of the receiver element in the transverse direction (y).

12. The panel device of claim 1, characterized in that the actuating element is arranged at least partially between the limbs.

13. The panel device of claim 1, characterized in that the actuating element is attached at its one end to the panel element and at its other end to the receiver element.

14. The panel device of claim 1, characterized in that the actuating element engages in grooves in the panel element, the receiver element or both the panel element and the receiver element.

15. The panel device of claim 1, characterized in that the force absorbing means, the limiting means, or both the force absorbing means and the stops are attached to the actuating element.

16. A sliding roof arrangement for a vehicle, comprising:
a frame attached in a roof opening of the motor vehicle,
an externally guided sliding cover which has a ventilation position (II), in which at least one gap is formed between the frame and the sliding cover,
at least one panel device by means of which in the ventilation position (II) the at least one gap may be closed,
a receiver element in which the panel element is at least partially received,
an actuating element which deploys the panel element relative to the receiver element in a first direction (z), the actuating element having an upper most point, a lower most point, and an intermediate portion between the upper most and lower most points, and
a spacer attached to the intermediate portion of the actuating element, disposed within the receiver element, and configured to transversely hold the actuating element relative to the receiver element.

17. The panel device of claim 1, characterized in that the sliding roof arrangement is designed as a module.

18. The panel device of claim 1, characterized in that the receiver element is itself formed by a part of the frame.

19. The panel device of claim 1, characterized in that the sliding cover has an injection-molded or removable further panel element, the further panel element being arranged
(1) closer to the panel element at a geometric center of the sliding cover,
(2) adjacent to the region of the space spanned by the frame, or
(3) both (1) and (2).

20. The panel device of claim 19, characterized in that the further panel element at least one of:
(1) engages, at least when the sliding cover is closed, in the receiver element,
(2) is arranged to rest against the panel element,
(3) is arranged to overlap the panel element.

21. The panel device of claim 1, characterized in that the sliding roof arrangement has a wind deflector.

22. The panel device of claim 1, wherein the panel is attached to a frame side in the sliding roof arrangement facing in the longitudinal direction (x) of the vehicle.

23. The sliding roof arrangement of claim 16 wherein the spacer is configured to limit vertical motion of the actuating element.

* * * * *